United States Patent
Swinehart et al.

(10) Patent No.: US 9,770,862 B2
(45) Date of Patent: Sep. 26, 2017

(54) METHOD OF MAKING ADHESION BETWEEN AN OPTICAL WAVEGUIDE STRUCTURE AND THERMOPLASTIC POLYMERS

(71) Applicant: KYTON, LLC, Columbus, OH (US)

(72) Inventors: Philip R. Swinehart, Columbus, OH (US); Mokhtar Maklad, Woodbury, MN (US)

(73) Assignee: KYTON, LLC, Columbus, OH (US)

(*) Notice: Subject to any disclaimer, the term of this patent is extended or adjusted under 35 U.S.C. 154(b) by 4 days.

(21) Appl. No.: 14/977,050

(22) Filed: Dec. 21, 2015

(65) Prior Publication Data

US 2016/0159000 A1    Jun. 9, 2016

Related U.S. Application Data

(63) Continuation-in-part of application No. 12/555,006, filed on Sep. 8, 2009, now Pat. No. 9,248,615.

(Continued)

(51) Int. Cl.
| | |
|---|---|
| B29C 65/02 | (2006.01) |
| B05D 3/00 | (2006.01) |
| B29D 11/00 | (2006.01) |
| G01K 11/32 | (2006.01) |
| B29K 63/00 | (2006.01) |

(Continued)

(52) U.S. Cl.
CPC ............ *B29C 65/02* (2013.01); *B05D 3/002* (2013.01); *B29D 11/00663* (2013.01); *B29D 11/00701* (2013.01); *G01K 11/3206* (2013.01); *B29K 2061/00* (2013.01); *B29K 2063/00* (2013.01); *B29K 2077/00* (2013.01); *B29K 2079/08* (2013.01); *B29K 2081/06* (2013.01);

(Continued)

(58) Field of Classification Search
CPC .......... B05D 3/002; B05D 3/00; B29C 65/02; B29D 11/00663; B29D 11/00701; B29D 11/00; B29K 2061/00; B29K 2063/00; B29K 2077/00; B29K 2079/08; B29K 2081/06; B29K 61/00; B29K 63/00; B29K 77/00; B29K 79/00; B29K 81/00; B29L 2011/0075

See application file for complete search history.

(56) References Cited

U.S. PATENT DOCUMENTS

| | | |
|---|---|---|
| 3,742,731 A | 7/1973 | Phillips et al. |
| 4,320,475 A | 3/1982 | Leclerc et al. |

(Continued)

FOREIGN PATENT DOCUMENTS

| | | |
|---|---|---|
| GB | 2 326 471 A | 12/1998 |
| JP | 2000-162444 | 6/2000 |

(Continued)

OTHER PUBLICATIONS

Communication mailed Jan. 13, 2014 in European Application No. 09 813 491.9 (4 pages).

(Continued)

*Primary Examiner* — Andrew Jordan
(74) *Attorney, Agent, or Firm* — Nixon & Vanderhye P.C.

(57) ABSTRACT

A compact method for forming strong hermetic bonds and seals. Such bonds are made simply and with no intervening adhesives, by directly melting a thermoplastic polymer against or between two surfaces of thermoset materials.

29 Claims, 17 Drawing Sheets

Related U.S. Application Data

(60) Provisional application No. 61/095,885, filed on Sep. 10, 2008.

(51) Int. Cl.

| | | |
|---|---|---|
| B29K 61/00 | (2006.01) | |
| B29K 79/00 | (2006.01) | |
| B29K 77/00 | (2006.01) | |
| B29K 81/00 | (2006.01) | |
| B29L 11/00 | (2006.01) | |
| G02B 6/02 | (2006.01) | |
| G02B 6/36 | (2006.01) | |

(52) U.S. Cl.
CPC ..... *B29L 2011/0075* (2013.01); *G02B 6/0218* (2013.01); *G02B 6/02209* (2013.01); *G02B 6/36* (2013.01)

(56) References Cited

U.S. PATENT DOCUMENTS

| | | |
|---|---|---|
| 4,418,102 A | 11/1983 | Ferrato |
| 4,726,650 A | 2/1988 | Grissom |
| 4,768,854 A | 9/1988 | Campbell et al. |
| 4,856,864 A | 8/1989 | Campbell et al. |
| 4,885,462 A | 12/1989 | Dakin |
| 5,132,529 A | 7/1992 | Weiss |
| 5,138,676 A | 8/1992 | Stowe et al. |
| 5,452,393 A | 9/1995 | Stowe et al. |
| 5,494,236 A | 2/1996 | Ekholm |
| 5,517,590 A | 5/1996 | Auborn et al. |
| 5,588,086 A | 12/1996 | Fan |
| 5,887,107 A | 3/1999 | Newman et al. |
| 6,003,340 A | 12/1999 | Borak et al. |
| 6,118,914 A | 9/2000 | Davis et al. |
| 6,125,216 A | 9/2000 | Haran et al. |
| 6,134,369 A | 10/2000 | Kurosawa |
| 6,205,264 B1 | 3/2001 | Jin et al. |
| 6,295,398 B1 | 9/2001 | Gillham et al. |
| 6,306,516 B1 | 10/2001 | Jin et al. |
| 6,374,014 B1 | 4/2002 | Jablonski |
| 6,374,041 B1 | 4/2002 | Asada et al. |
| 6,442,304 B1 | 8/2002 | Crawley et al. |
| 6,453,092 B1 | 9/2002 | Trentelman |
| 6,586,722 B1 | 7/2003 | Kenny et al. |
| 6,612,753 B1 | 9/2003 | Cryan et al. |
| 6,677,576 B1 | 1/2004 | Kenny et al. |
| 7,114,312 B2 | 10/2006 | Coppeta et al. |
| 7,187,839 B2 | 3/2007 | Tourne |
| 7,269,320 B2 | 9/2007 | Herbst |
| 7,324,714 B1 | 1/2008 | Cranch et al. |
| 7,330,624 B2 | 2/2008 | Isenhour et al. |
| 7,570,853 B2 | 8/2009 | Mahapatra et al. |
| 7,766,561 B1 | 8/2010 | Mahapatra et al. |
| 7,809,029 B2 | 10/2010 | Poulsen et al. |
| 7,813,598 B2 | 10/2010 | Mortensen |
| 8,261,442 B2 | 9/2012 | Zheng |
| 8,340,482 B2 | 12/2012 | Arashitani |
| 9,138,948 B2 | 9/2015 | Swinehart et al. |
| 2002/0028034 A1 | 3/2002 | Chen et al. |
| 2002/0110330 A1* | 8/2002 | Brogan ................ G02B 6/2558 385/51 |
| 2002/0172446 A1 | 11/2002 | Fernald et al. |
| 2004/0083808 A1 | 5/2004 | Rambow et al. |
| 2006/0024008 A1 | 2/2006 | Galvanauskas |
| 2006/0127024 A1 | 6/2006 | Smith et al. |
| 2008/0085074 A1 | 4/2008 | Wakahara et al. |
| 2010/0061678 A1 | 3/2010 | Swinehart et al. |
| 2011/0058768 A1 | 3/2011 | Swinehart et al. |
| 2016/0159000 A1* | 6/2016 | Swinehart ............... B29C 65/02 427/163.2 |

FOREIGN PATENT DOCUMENTS

| | | |
|---|---|---|
| WO | WO 00/28294 | 5/2000 |
| WO | WO 2008/090348 A1 | 7/2008 |

OTHER PUBLICATIONS

Extended European search report and European search report in EP 09 813 491.9-1524 (Feb. 15, 2012).
Corning SMF-28e Optical Fiber Product Information, Corning Incorporated, www.corning.com/osticalfiber (Dec. 2007).
OFS A Furukawa Company, "Measuring NA," 1 page.
Kim et al., "Development of an FBG-Based Low Temperature Measurement System for Cargo Containment of LNG Tankers," Fiber Optic Sensors and Applications, Proc. of SPIE vol. 6770, 6770D (2007).
Viegas et al., "Non-terminal miniature fiber Bragg grating temperature probe based in a u-shape lossless taper," Measurement Science and Technology 21 (2010) 094002 (5pp).
International Search Report and Written Opinion of the International Searching Authority issued in corresponding PCT Application No. PCT/US2009/056150 (Apr. 19, 2010).
U.S. Office Action issued in U.S. Appl. No. 12/944,052 dated Sep. 28, 2011.
U.S. Office Action issued in U.S. Appl. No. 12/944,052 dated Aug. 6, 2012.
U.S. Office Action issued in U.S. Appl. No. 12/944,052 dated Jun. 19, 2014.
U.S. Office Action issued in U.S. Appl. No. 12/944,052 dated Jan. 22, 2015.

* cited by examiner

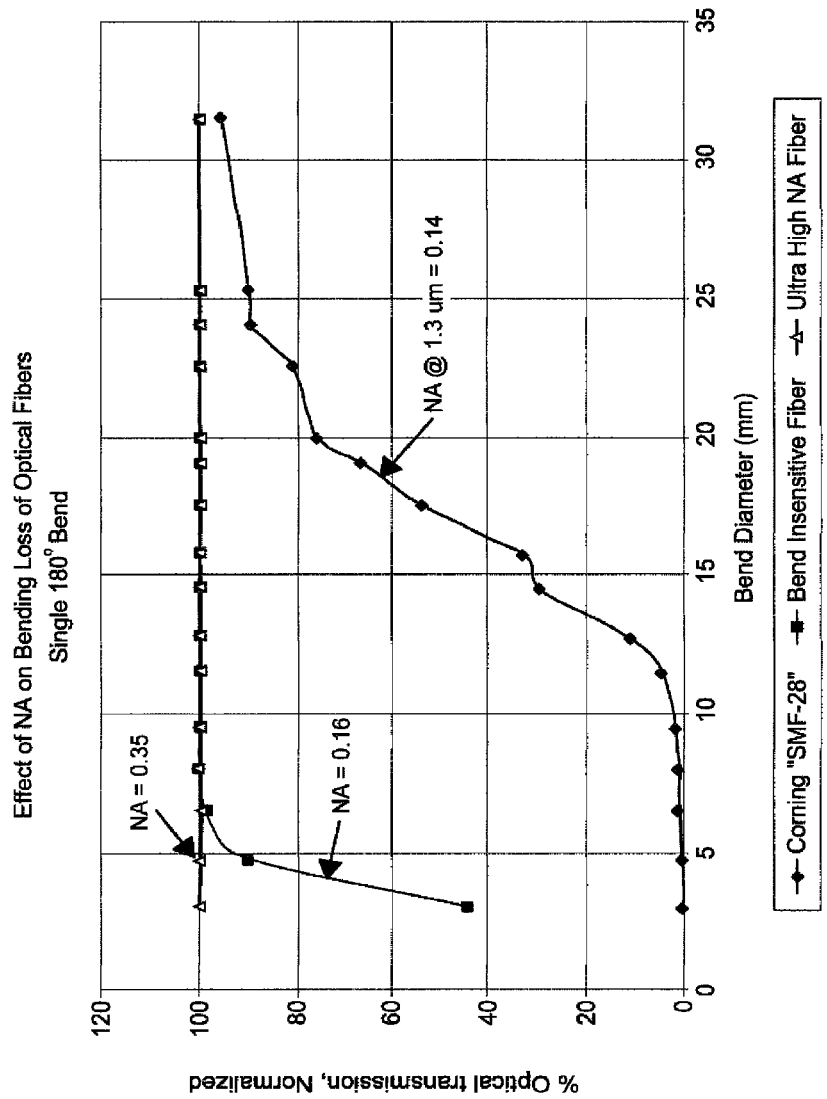

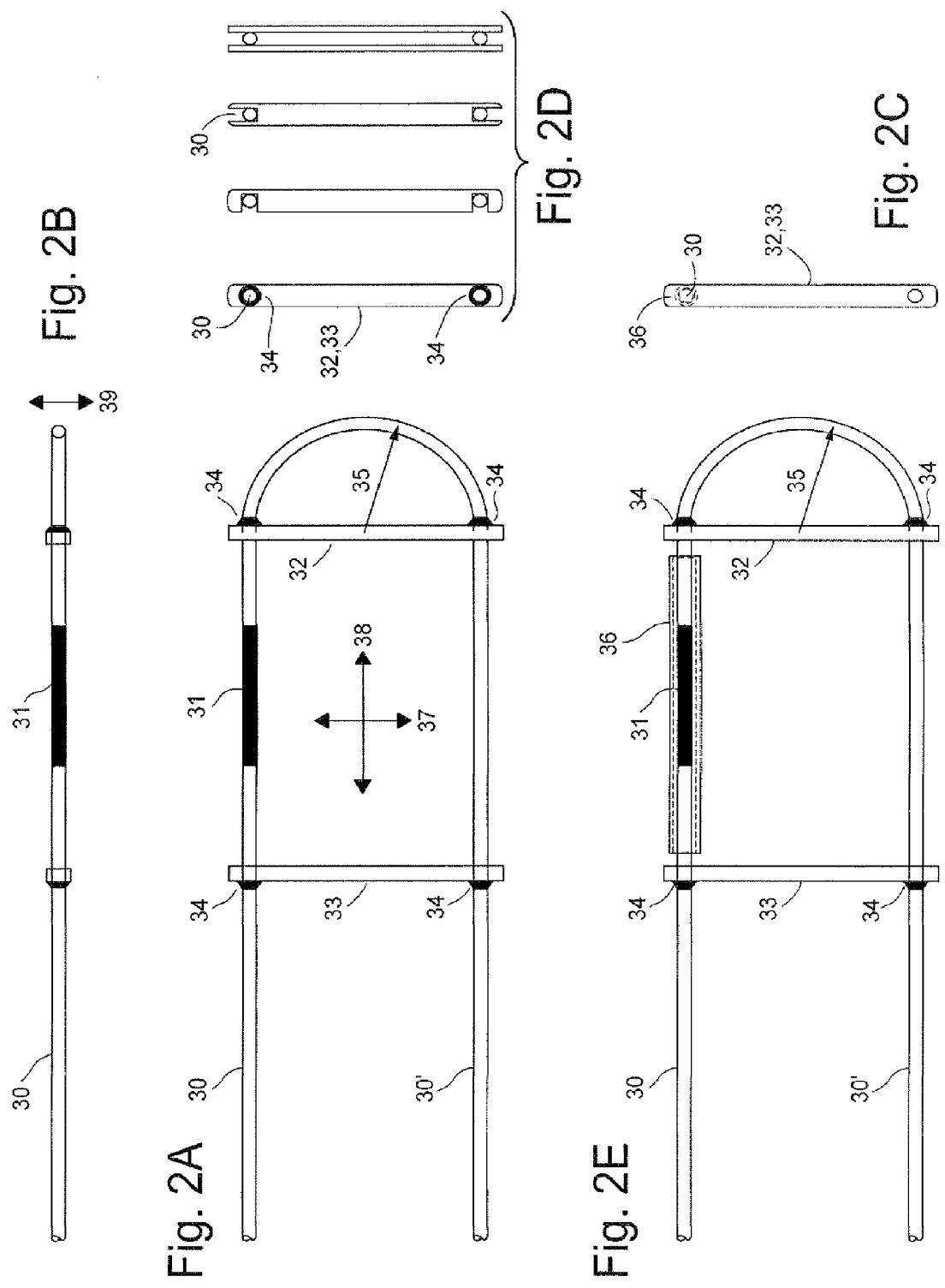

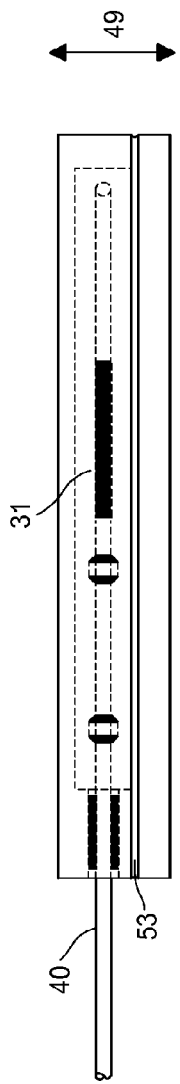
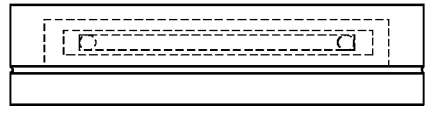
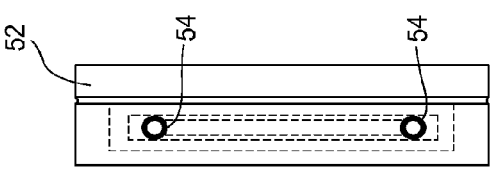
Fig. 4B
Thermally formed bend

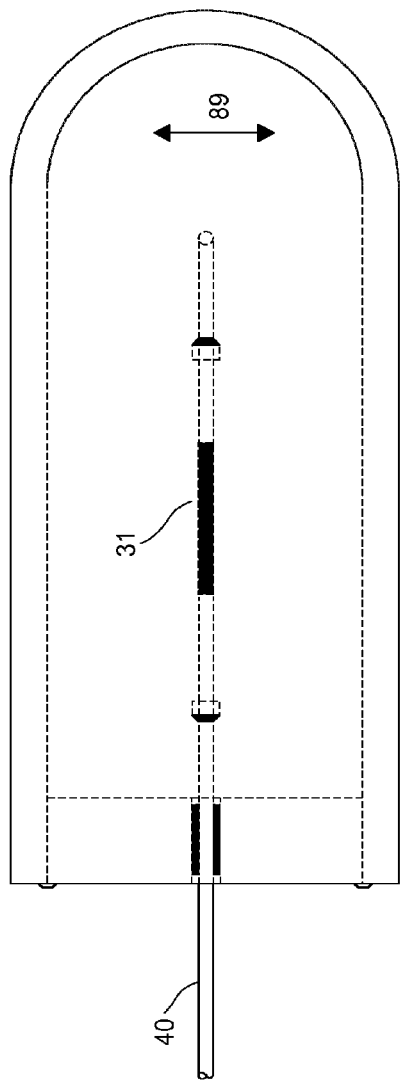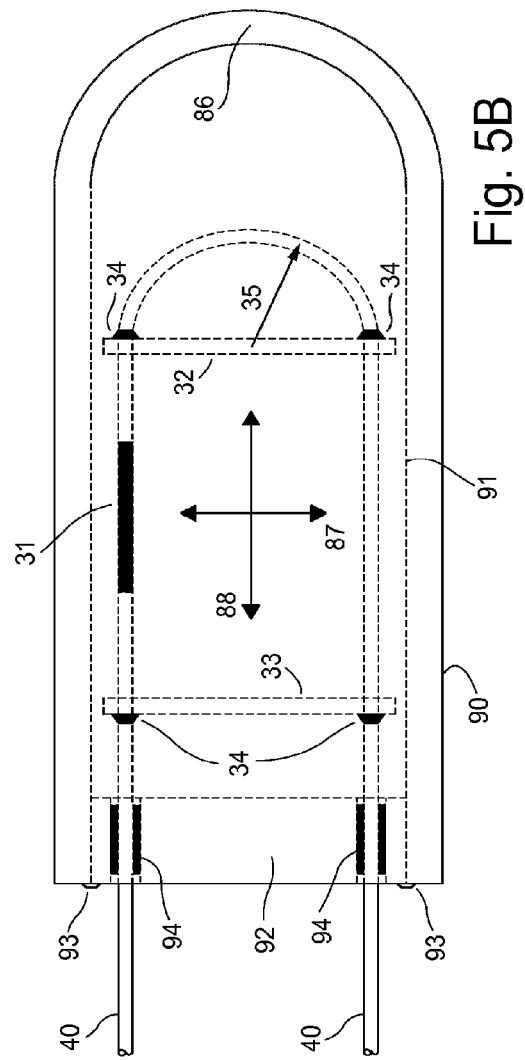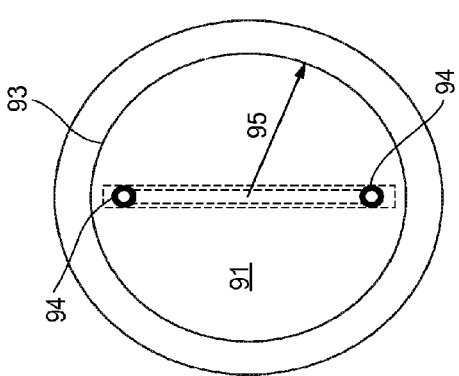

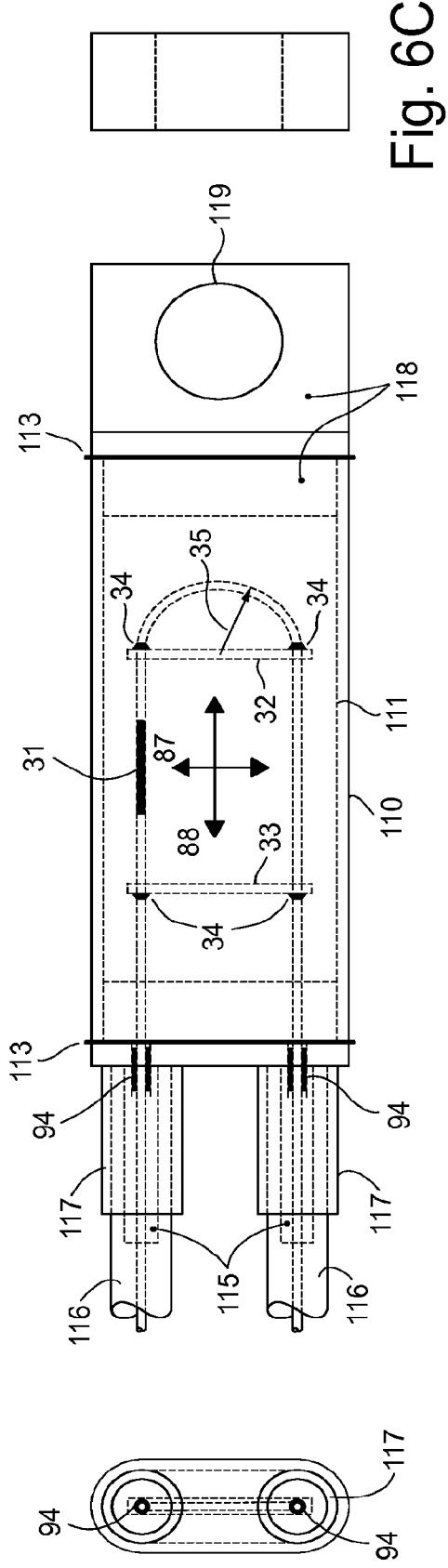

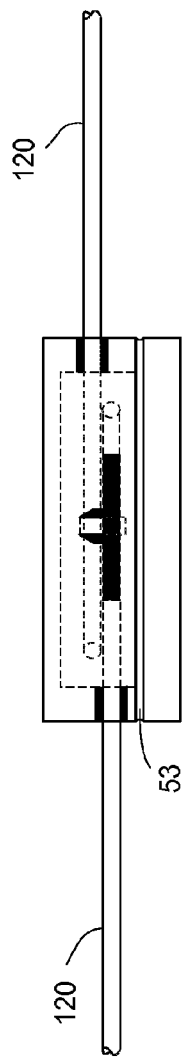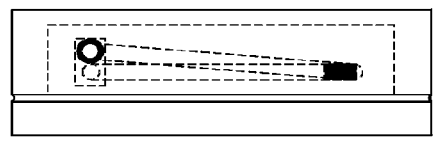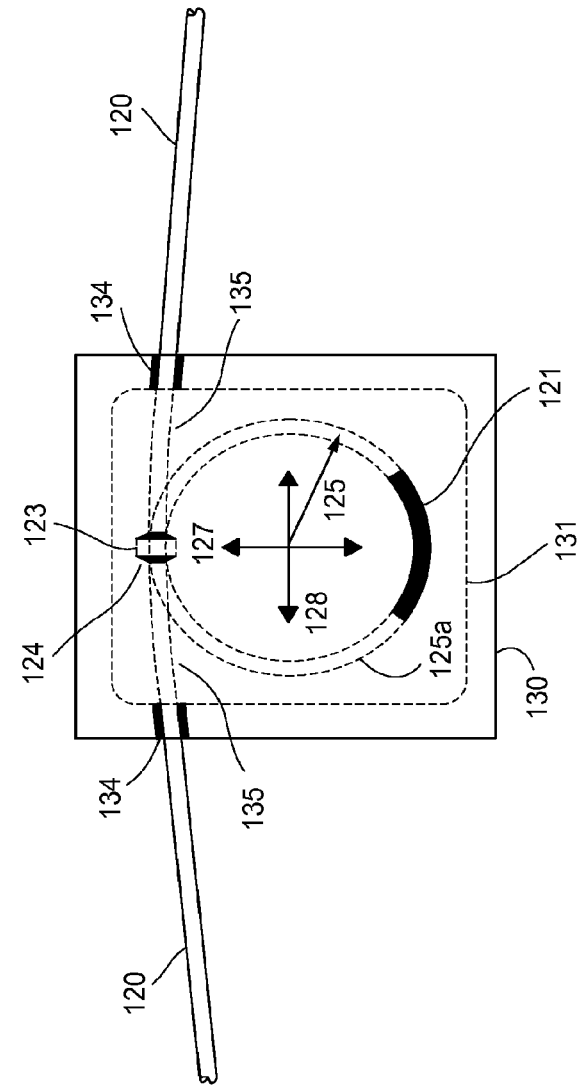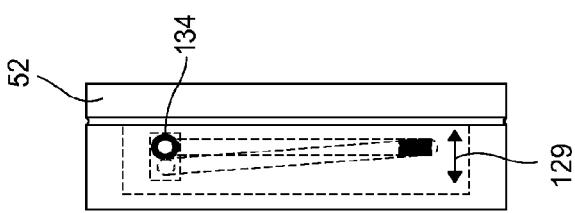

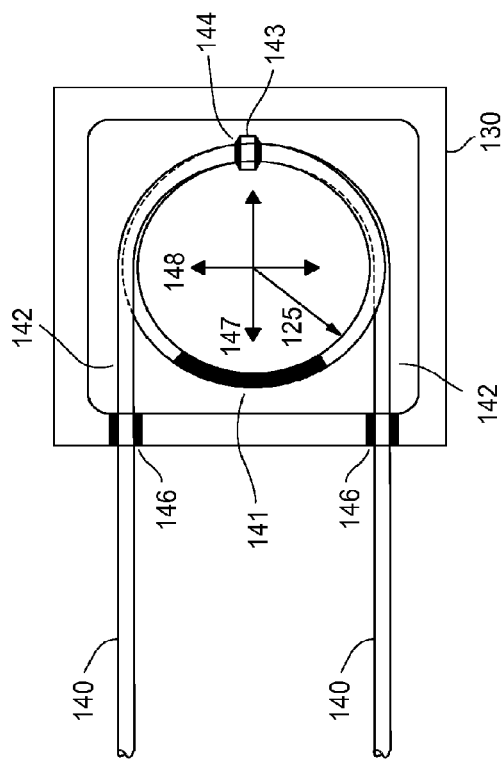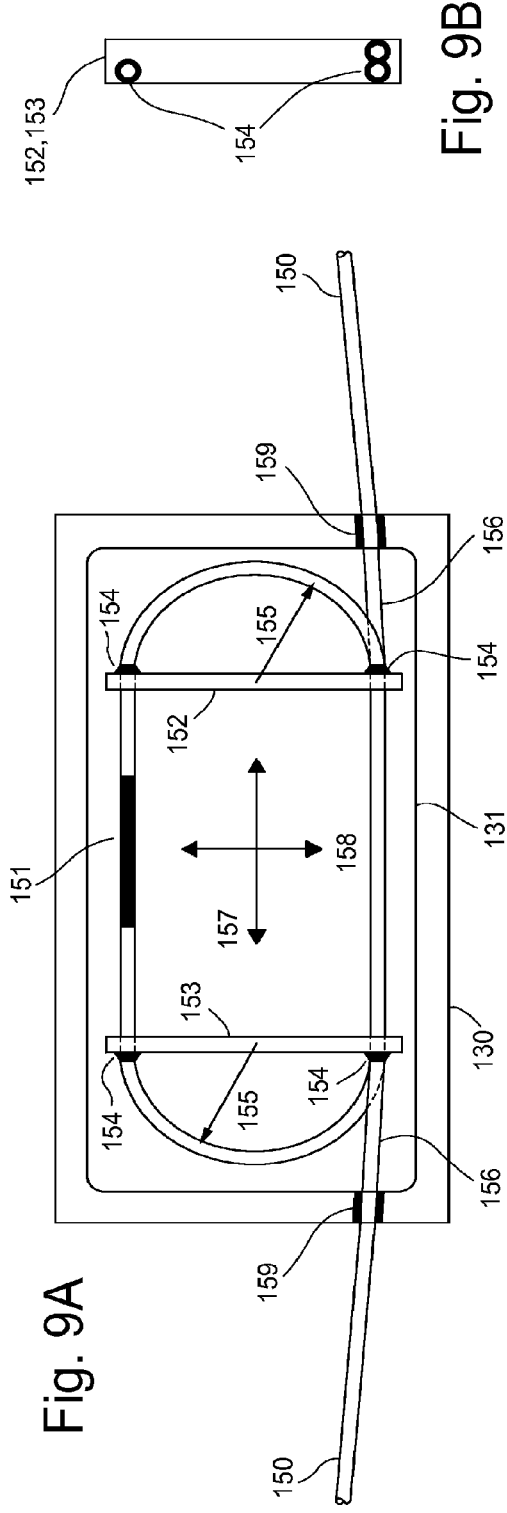

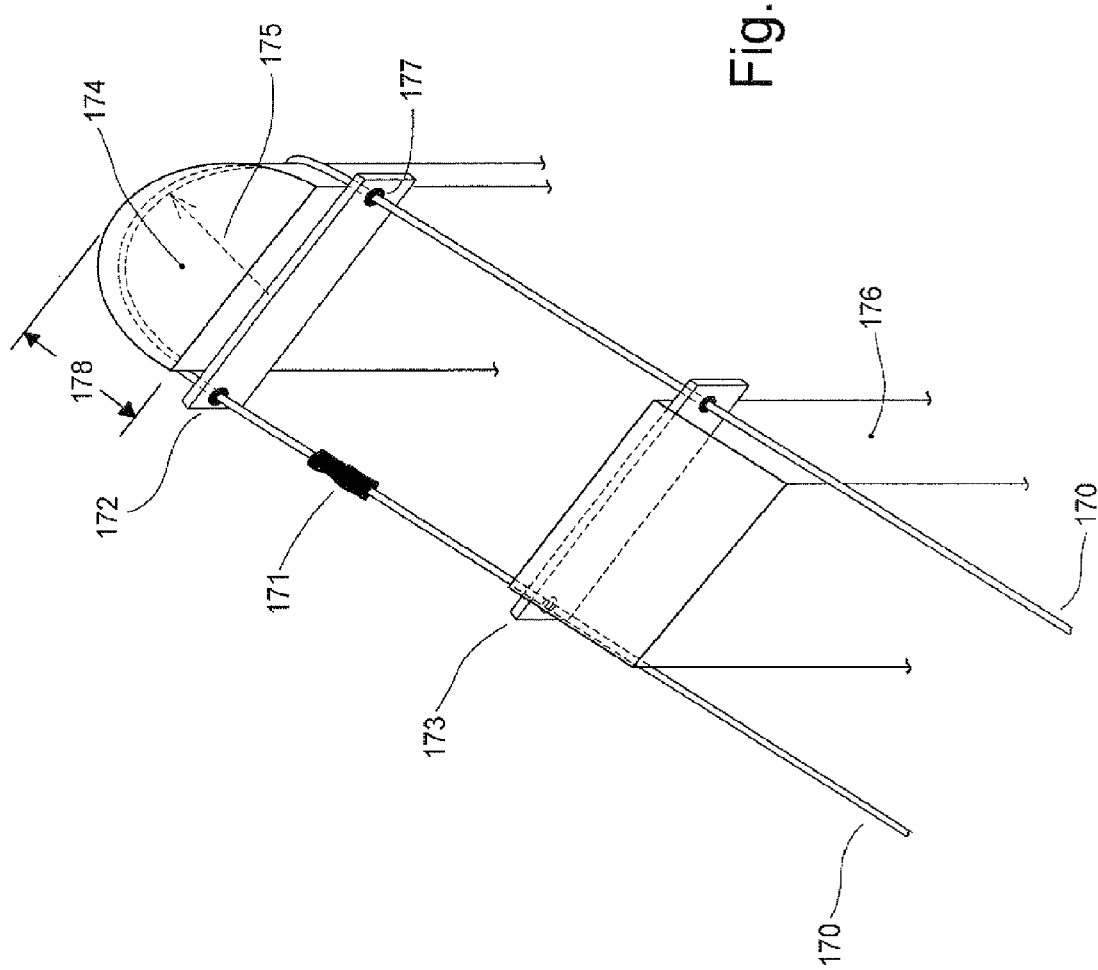

Shown Sealed. Mold Jaws Left Out for Clarity

Oval Tube Example with Bolt Hole End Cross Section

Seal End. View before Sealing

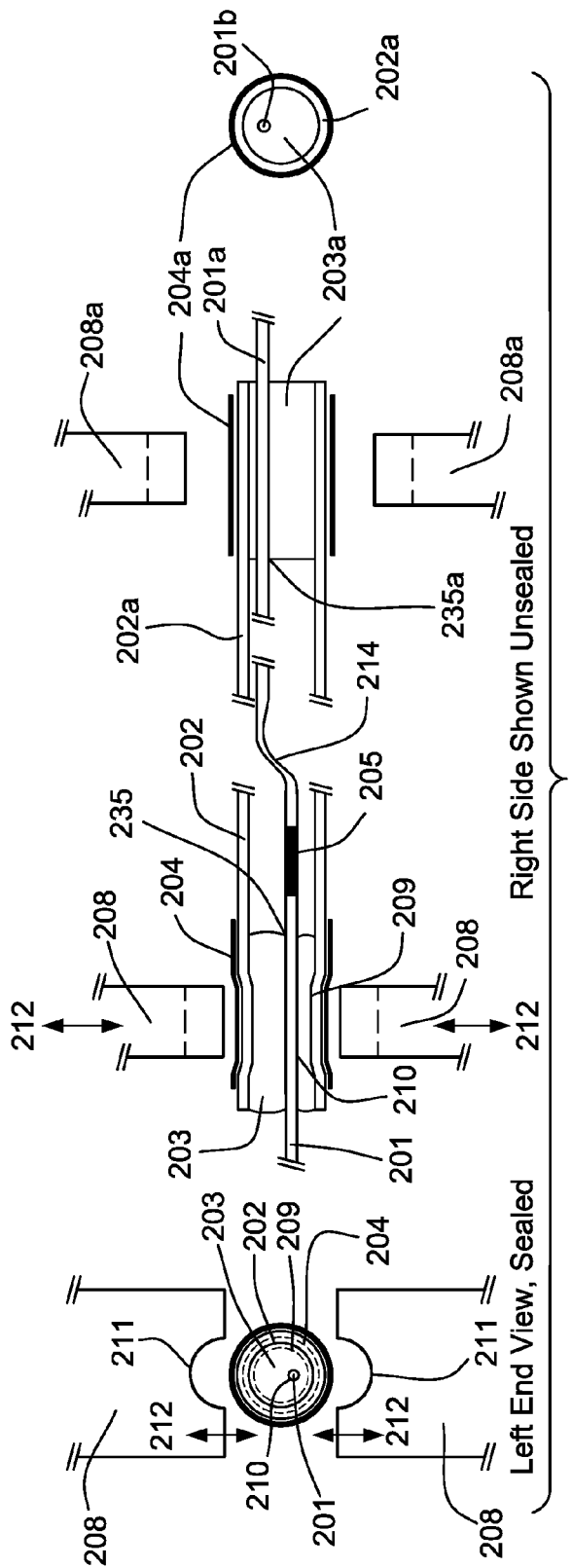
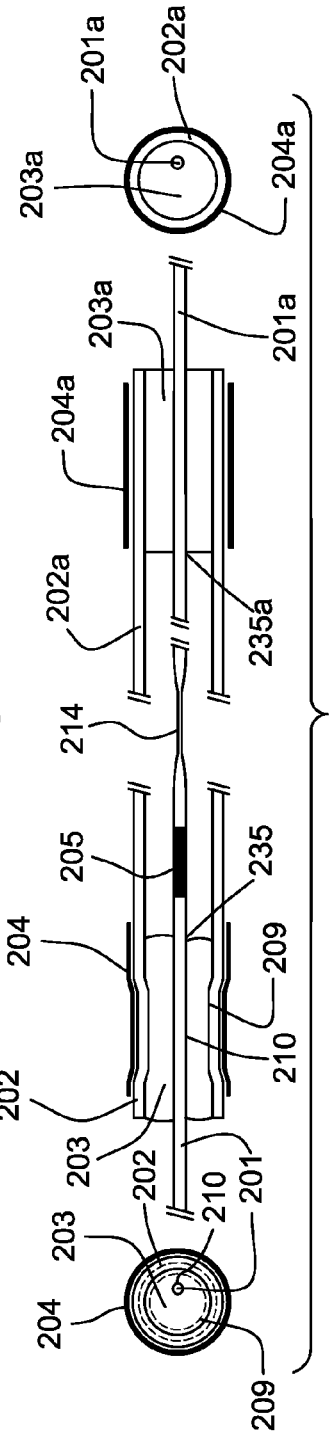
FIG. 14A
FIG. 14B

End View  Through holes 231, 232 not shown for clarity

Cross Section

End View

METHOD OF MAKING ADHESION BETWEEN AN OPTICAL WAVEGUIDE STRUCTURE AND THERMOPLASTIC POLYMERS

CROSS-REFERENCE TO RELATED APPLICATION

This application is a Continuation-In-Part of U.S. application Ser. No. 12/555,006, filed Sep. 8, 2009, now allowed, and claims the benefit of priority from U.S. Provisional Application No. 61/095,885 filed Sep. 10, 2008, the contents of which are incorporated herein by reference.

TECHNICAL FIELD

The technology herein relates to techniques for creating strong bonds between polymer materials and devices made from or coated with the polymer materials, where the bonds remain hermetic over a wide range of temperature changes. The techniques do not require adhesives, such as epoxies, or the use of expensive lasers, heating filaments, infrared lamps or adhesive applicators. Thus, all components assembled by this means can also be the primary structural parts of a device, as a non-limiting example, a thermoplastic casing and a thermoset-coated optical fiber. At times, a non-structural mold release material may be utilized, and at times, a thermoset structural part may also function as a mold release.

BACKGROUND AND SUMMARY

Many or most single mode communications-grade optical fibers and many multi-mode fibers are fabricated from high-silica glass components. Such fibers have a high Young's Modulus, and are termed nearly "perfectly elastic" in addition to possessing very low thermal coefficients of expansion. This combination of properties makes the optical fiber quite stable for communications purposes in the field if precautions are taken to protect it from moisture-caused static fatigue failure, hydrogen diffusion (causing higher absorption of light) and physical forces, among other dangers. Such protection means include, but are not limited to, coating (e.g., during the fiber drawing process) with materials such as acrylates, polyimides, carbon, diamond-like carbon, copper, aluminum and other materials that can be applied to the fiber during the high speed drawing process. These coatings are usually termed "buffer" coatings. Subsequently, the fibers are frequently cabled or jacketed with materials that include strength members (e.g., Kevlar' fibers) and jackets for crush and kink protection. During the drawing process, a glass preform, with the same cross sectional index of refraction profile as proportionally required in the much smaller diameter fiber is progressively melted on one end and the fiber is pulled, or drawn, from the melt at high speed. Similarly, a section of existing fiber can be drawn, or tapered, making it suitable for fabricating optical sensors in some aspects of the present method.

Such fibers often include in their structures at least one core with at least one index of refraction and at least one glass cladding adjacent to the core with at least one index of refraction that is lower that than of the core in order to substantially confine light to the core. This general, non-limiting structure also applies generally to other waveguide shapes, such as planar waveguides.

Optical fiber sensors of temperature and/or strain based on common fiber Bragg gratings ("FBGs") can be fabricated in the cores of optical fibers by various means. These gratings are characterized by alternating regions of index of refraction value along a longitudinal length of the fiber core having some pitch, or period. There are several distinct types or varieties of FBGs, including but not limited to short period, long period, blazed and phase shifted gratings. Further, these types can be modified by varying the period (chirp), amplitude (apodizing), index background level and/or physical damage level used to fabricate the gratings. Such damage can be induced by a higher intensity of the FBG fabricating light (usually ultraviolet, or UV lasers; in some cases $CO_2$ lasers, argon ion lasers, femptosecond lasers or other sources) than is actually necessary to write the grating. The number of cores, core shapes, number of cladding layers, and addition of stress-inducing members can all be varied to control the optical properties for various applications. Different elements can be added to the glass formulation to control the index contrast between the core(s) and the cladding(s).

Advantages of optical sensors over electronic sensors are generally well known, in spite of their present overall greater cost (including the sensor readers). Such advantages include, but are not limited to, immunity to electromagnetic interference (EMI) and electromagnetic pulses (EMP), corrosion resistance, explosion-proof nature, light weight, small size and potential for all-dielectric construction (leading to high voltage compatibility). In addition, sensors based on FBGs enjoy the ability to be multiplexed on a single optical fiber in large numbers by several means, including wavelength division multiplexing (WDM) and optical frequency domain reflectometry (OFDR), leading to a lower cost per sensing point when the cost of the reading instrument is averaged over the number of sensors attached. Further, only a single feedthrough point through bulkheads and pipes is needed for a high sensor count, leading to enhanced ease of installation and lower vulnerability to breach of the bulkhead integrity at the feedthrough. In order to be multiplexed in this way, physically in series along the fiber, the sensors should generally be optically double ended, or have an input fiber and an output fiber (it is understood that the input and output fibers are interchangeable for an FBG). In order to make FBG sensors both small enough to be compatible in form factor with electronic sensors and optically double ended requires innovation beyond the present state of the art.

Most types of FBGs are sensitive to both temperature and strain variables to essentially the same degree for a given type, although the degree of interdependence on the two variables may vary from type to type. Further, if the FBG is fabricated in the core of a high-silica fiber, such as is commonly done, the sensor also has the properties of high Young's Modulus and low coefficient of thermal expansion. These properties generally cause difficulty if the sensor is to be used over a very wide temperature range, if their temperature sensitivities or temperature ranges need to be enhanced beyond that of the simple buffered fiber (by attachment to a material of a higher expansion coefficient), if they will be subjected to rough handling, or firmly mounted to dissimilar materials (to enhance thermal equilibrium with the object to be measured). In addition, fabrication difficulties increase when the effects of strain are to be separated unambiguously from those of temperature and when the sensor is made compact enough to compete with existing electronic sensors in form factor while still maintaining their ability to be multiplexed.

If a section of optical fiber containing an FBG is attached to another object or material (substrate) with adhesive or even thermal grease, the FBG's temperature calibration and even repeatability is significantly and usually adversely affected by all the components of the attachment system, especially over a temperature range of tens or hundreds of degrees Celsius, because of the strain sensitivity of the FBG. If encapsulated in a material such as an epoxy or another material that is not "perfectly elastic" (i.e., a material that is subject to measurable viscous flow), the mechanical stiffness of the fiber causes the fiber to 'creep' or move through the viscous material when stressed by changes in temperature or mechanical causes. This occurs even if the length of the attachment or encapsulation greatly exceeds the length of the FBG itself. In addition, the viscous material itself is often not stable under thermal cycling, especially if it is a glass with a low melting point or is a polymer and its glass transition temperature is exceeded. These effects can lead to variations of temperature calibration of many degrees Celsius from cycle to cycle and even to the loss of optical signal through the gradient-induced breakup of the single reflection peak into multiple peaks (termed accidental chirping, in contrast to the intentional variation of the period of a grating during fabrication).

While it can be more difficult to measure strain without temperature effects, measuring temperature without strain affects can be done with varying degrees of success with appropriate packaging (i.e., placement within a casing) in order to remove the FBG from the effects of stress due to handling or attachment to another object. Although such packaging inevitably increases the dimensions, mass and thermal response times of the FBG sensors, such packaging is necessary to make the sensors of general use in industry. On the other hand, it is extremely desirable to make fiber optic temperature sensor packaging as small and thermally fast as possible, and further to emulate the form factors of commonly used electronic temperature sensors to promote the market acceptance of the newer optical technology in the marketplace.

In order to make the sensors in a physically single ended, 'probe' configuration such as is easily done with thermocouples and thermistors, with both fibers coming out of the same end of a small tube or other casing, the fiber may be bent in at least a 180° 'hairpin' curve in a way that avoids losing significant light transmission (a few tenths of a percent per sensor may be permissible in a sensor array of 100 sensors, for example). Conventional communications-grade optical fibers (e.g., Corning SMF-28) begin losing significant amounts of optical transmission when bent in diameters as large as 30 mm.

FIG. 1 shows example experimental data on power loss from single 180° bends in three types of optical fibers. For a single sensor on a fiber, losses of 50-90% might be tolerated, but if several are to be multiplexed on a fiber, losses of less than 1% are desirable. From the point of view that multiplexing can be highly beneficial for lowest systems costs, fewest fibers and feedthrough points, etc., it is evident that low loss can be important. FIG. 1 demonstrates that the particular common communications fiber Corning "SMF-28 with a numerical aperture of about 0.14 at 1310 nm (1% power level) generally cannot be used to make a low loss compact sensor, but if the numerical aperture is increased, smaller sensors can be fabricated that are also low loss. This data does not address concerns with the well-known increased static fatigue failure of optical fiber as the bend radius decreases below about 3 mm; it is an illustrative example only of the optical power loss due to the bend. For example, the estimated lifetime of a buffer-coated fiber (that has never been stripped and recoated) bent in a 3 mm radius is greater than 50 years while a bend of 1.5 mm radius would have a failure time measured in hours. To avoid any such increase in fatigue failure for bend radii less than about 2 to 4 mm, thermal bending and annealing of the fiber comprising the bend is desirable. If the thermal process does not induce an adverse chemical or physical change in the core of the fiber, the benefits of the high numerical aperture fiber will be retained and the probability of fiber fracture will be significantly reduced.

In general use, a fiber optic sensor casing (e.g., a package) with a width or diameter of 20-30 mm or greater is highly undesirable. Since electronic industrial sensors frequently are packaged in tubes with diameters of 0.5 to 13 mm, optically double ended, physically single ended fiber optic temperature sensor probes with diameters of 0.3 to a maximum of 13 mm, and preferably 0.3 to 6 mm, will find enhanced utility in industry. This discussion of round or tubular sensor probes does not exclude other cross sectional geometries, such as rectangular or oval cross sections.

The exemplary illustrative technology herein provides compact, optically double-ended sensor probes with at least one substantially 180° bend provided in the optical fiber in close proximity to an FBG sensor. This example non-limiting structure may include for example all versions of at least net 180° bends by definition and bends of somewhat less than 180° that would lead to slightly divergent input and output fiber directions but still allow a physically single-ended probe configuration within a desired maximum diameter. Further, the FBG sensor can in example non-limiting implementations be suspended in the probe in such a way that the expansion and contraction of the probe casing will not materially influence the temperature reading of the FBG by adding time-or-temperature varying stress components to the FBG. To accomplish this, the fiber, sensor element and any other structural elements attached to the fiber inside the casing must be of low enough weight to not bend in any direction significantly under the force of gravity and be suspended in space only by the optical fiber itself from the two points of penetration of the fiber through the casing walls. By this means, the optical fiber sensor structure cannot touch or rub on the casing walls. Thus, such time-dependent drift mechanisms that can be avoided include creep in reading (at a constant temperature) that frequently occurs when attempts are made to fasten fibers incorporating FBGs at both ends of the FBG to the casing in a direction substantially on a line with each other, even if said fiber is bent somewhat (substantially less than 180°) to prevent fiber breakage.

Mechanical 180° bends can be mechanically restrained to force them into a compact form factor if means are employed to prevent such restraints from themselves causing variations in the calibration of the sensors with time and temperature cycling. Thermally formed bends can be made by heating the fiber beyond its softening point utilizing any of the methods of, but not exclusively confined to, a flame, an oven, a hot filament, a glow bar, or a laser, for instance a $CO_2$ laser. The buffer coatings can be removed before heating, burned off during the bending operation or, if an inert atmosphere is employed, an adherent, protective carbon layer can be left on the fiber bend. Reliability of the bend can be enhanced by annealing and slow cooling the bend. Since FBGs in many fibers can be erased by high temperature, the FBG can be of a type that can withstand the temperature of the bending operation, it can be written into the fiber before bending and kept a safe distance away from the bend or the fiber can be loaded with hydrogen after the bending operation and the grating can be written into the bent fiber after the hydrogen loading step.

In general, it is difficult to make strong bonds to thermoset polymer materials (thermosets) and devices made from or coated with such a polymer, especially if materials with widely differing expansion coefficients are to be bonded to them and/or wide temperature excursions are to be encountered by the assemblies. This is especially true if hermetic bonding is to be maintained over wide temperature ranges or the use of the assembly at high temperatures is required, which is a salient property, or capability, of some thermosets. As an illustrative, nonexclusive example, polyimide materials such as Kapton™ have a service temperature greater than 300° C. Most bonding adhesives such as epoxies adhered to thermosets eventually experience leaks or delamination under extreme temperatures and multiple temperature cycles and also can be difficult to apply and use cleanly and simply, especially over large areas. Illustrative, non-exclusive examples for requirements for such seals include requirements for hermetic seals to polyimide coated optical fibers for sensor casings or vacuum or pressure bulkhead feed-throughs.

The exemplary, illustrative technology presented herein provides a novel method for forming strong hermetic bonds and seals. Such bonds can be made simply and with no intervening adhesives, by directly melting a thermoplastic polymer (thermoplastic) against or between two surfaces of thermoset materials. Further, such bonds can be formed locally without the use of expensive lasers, heating filaments, infrared lamps or adhesive applicators, by clamping the thermoplastic to or between the thermoset objects with heated jaws or clamps (herein termed mold jaws) through which an adequate force is also applied. Moreover, the present inventors have unexpectedly discovered that a thin layer of a polyimide material applied to the outer surface of a thermoplastic acts as an effective mold release, preventing the melted thermoplastic from sticking to and squeezing out of the confines of the heated jaws or other heated melting clamps, yet allowing the molten thermoplastic to conform to the required surfaces being bonded. As used here, the "outer surface" of the thermoplastic is the surface upon which the mechanical force would act directly if not for the interposed mold release material, unless otherwise specified.

As an illustrative, nonexclusive example, the below-described process can be applied to hermetic seals around silica glass optical fibers with polyimide buffer coatings, taking advantage of their common availability and high temperature and chemical resistance. Such seals can be used to great advantage with high temperature, high strength thermoplastics such as polyether ether ketones (PEEK) and polyether ketone ketones (PEKK). As an illustrative, non-exclusive example, suspended fiber optic fiber Bragg grating (FBG) temperature sensors to be used in a small space require light weight, hermetically sealed casings because of launch weight limits and the fact that the thermal connection between the suspended FBG and the casing is provided by a gaseous atmosphere that must be prevented from leaking out of the casing for a period of years. Suprisingly, hermetic seals described here survive many thermal cycles between liquid nitrogen temperatures (77K, −196° C.) and 250° C. without appreciable increases in leakage.

Additional exemplary illustrative non-limiting features and advantages include:

A compact optical fiber temperature sensor that is optically double ended and can be made either physically single or double ended as a probe or in-line, respectively, encompassing at least one FBG in close proximity to at least one bend in the fiber comprising at least one net 180° path in the case of a probe, or with an 'S' bend in the case of an in-line sensor in which the entrance and exit fibers follow the original line of the fiber as though the sensor had not been inserted said fiber having a numerical aperture of greater than 0.15 at least within the bend or bends as measured along the center length axis of the fiber said FBG further mounted within an outer casing the optical fiber is a single mode fiber the radius of the smallest at least one net bend is from 0.01 mm to 10 mm and preferably from 0.15 mm to 5 mm an arrangement of fiber and FBG is mounted and maintained in physical independence of expansion and contraction of the outer casing, including rubbing on the casing by suspension by the mechanical stiffness of the fiber from the point or points of penetration of the fiber through the casing.

mechanical stress placed upon the outer casing, as in fastening said casing to an object to be measured for temperature, has no or substantially no effect on the temperature calibration of the FBG the input and output fibers emerge or can be caused to emerge from the casing essentially at the same end and substantially parallel to each other in a probe configuration the application of a bend or bends of greater than 180° or multiple bends can cause the input and output fibers to emerge from the casing at up to 180° from each other (i.e., at 90° or 180° substantially orthogonal or parallel to each other) from the same or different casing surfaces said casing contains an atmosphere said casing is environmentally and/or hermetically sealed the at least one FBG is contained in a straight section of fiber within the distance of from 0.01 mm to 100 mm from one end of the at least one 180° bend in the fiber and preferably from 1 mm to 10 mm the at least one FBG is at least partially contained within the at least one net 180° bend in the fiber the FBG is fabricated in un-stripped fiber according to the definition the at least one 180° bend in the fiber is formed by at least one method chosen from the group mechanical bend, thermal bend or tapered bend (per the definitions)

the at least one bend contains at least one length of longitudinally tapered index of refraction, exclusive of the FBG the at least one net 180° bend in the fiber is confined and supported by at least one rigid brace across approximately the diameter of the bend and weighing between 10 ng and 10 g, and preferably between 10 µg and 100 mg, such that the weight of the at least one brace is supported entirely by the fiber, free of contact with the casing, and further the at least one brace moves freely with the fiber within the sensor casing without adding variable stress to the FBG the casing is made entirely of dielectric materials the casing is hermetically sealed the hermetic seal is chosen from one of the group of a weld, a bond, a metal alloy solder or sealing glass composition the optical fiber in the area of the hermetic seals is provided with at least one of or a combination of a solderable metal coating, an organic buffer coating or no buffer coating the metal alloy solder contains at least one rare earth element.

the FBG is contained within a 360° bend the 360° bend is substantially circular and the diameter of said circle of fiber is fixed by at least one brace at the point of closure of said circle of fiber and which further forces the input and output fibers to emerge substantially tangentially to and near the plane of said circle the length of the FBG is bare (without a buffer or any other coating)

the FBG is protected from damage by at least one support with at least one projection running substantially parallel to the FBG and weighing between 10 ng and 10 g, and preferably between 1 µg and 10 mg said longitudinal support is a tube encompassing the FBG and unattached to the fiber (i.e., floating freely on the fiber)

said tube is attached to the fiber or other portion of the support structure on only one end, and in which the fiber is free to expand and contract independently of said tube the tube is composed of one or more of a metal, metal alloy, glass, ceramic, composite or polymer the atmosphere in the casing contains helium gas for the purpose of enhanced thermal conduction between the casing and the FBG the optical fiber containing the at least one 180° bend is holey fiber, nanostructured fiber or photonic crystal fiber a bend in an optical fiber in which the optical intensity losses are reduced by increasing the index of refraction of the fiber core within only the bend by means of exposure to ultra violet radiation at least over a portion of the length of the bend a bend in an optical fiber in which optical fiber within the bend is subjected to ultraviolet radiation in order to increase its numerical aperture, in which process said deep ultra violet radiation is any combination of constant and varying intensity over the length of the bend.

More than one layer of thermoplastic can be bonded or sealed to the optical fiber thermoset buffer coating at one time by simultaneously welding the thermoplastic layers together while the bond to the thermoset is being made.

The layers of thermoplastic can be thicker than what is the usual limit of about 1 mm for laser welding.

One or more layers of thermoplastic can be re-enforced with glass fiber, carbon fiber or other re-enforcement material, or colored with an additive.

All welded tubing can be the same color, as opposed to laser welding in which one black layer must be incorporated to absorb light and convert to enough heat to melt the two layers together. Alternatively, a third absorbing layer, an absorbing layer, must be applied and subsequently left in the weld area for laser welding to work. Usually, with laser welding, there is a limit of 2 layers to which force must be applied by clamping outside the weld area. Alternatively, the clamp material may be transparent to the laser light, or the design of the two parts must provide clamping force through tension or interference forces. These requirements complicate the welding or bonding process and make it more expensive, not to mention the cost of the equipment.

Common extruded thermoplastic tubing, cut to any length, can be used for many casing components, reducing costs.

A section of thermoplastic tubing, bonded to the fiber thermoset buffer coating at each side of a fusion splice, can be used as an effective strain relief for splices without requiring recoating of buffer material on the splice length or the common combination of a reinforcing rod and heat-shrinkable tubing.

Sections of thermoplastic tubing can be used as crimp rings to attach various cabling jackets to the sensor casing or splice strain reliefs, keeping the whole assembly all-dielectric, a valuable asset for high voltage and some corrosion-resistant applications.

Multi-lumen tubing can be used to seal around more than one fiber at once.

This process of utilizing sections of various inside diameter (ID) and outside diameter (OD) dimensions of tubing that can slide over the fiber and also each other before welding and/or bonding lends itself to automation.

Vacuum feedthroughs employing the present sealing method can be easily and cheaply adapted to many different optical fiber sizes and types.

In this way, an all-dielectric packaging system for strain-isolated temperature sensors can be employed that enhances the functionality of the basic dielectric nature of optical fibers.

One type of fixture that may be employed to accomplish the welding or bonding utilizes two heated jaws that clamp the tubing and are designed to reduce the tubing diameter(s) while melting them together (a weld) and to a thermoset fiber buffer coating (a bond). Another type of fixture may consist of two large area flat jaws if the welding and bonding must be accomplished over a large planar area. Many other configurations of fixtures may be utilized to accomplish different objectives. Any such process can be designated here as "welding or bonding, or collectively or in part as sealing", hermetic or otherwise, especially if the seal is intended to maintain a fluid pressure differential across it, and the fixture may be called a "sealing fixture", sealing jaws, mold jaws, or simply "fixture".

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 1 shows example experimental data on power loss from single 180° bends in three types of optical fibers;

FIGS. 2A-2E show different views of one example illustrative non-limiting example implementation providing a competitively small, physically single-ended and yet optically double-ended, strain-free temperature sensor probe;

FIGS. 4A-4D show an illustrative example of a fiber bent by thermal means, not requiring a physical restraint means across the diameter of the bend;

FIGS. 5A-5C show an exemplary illustrative non-limiting implementation of a physically single-ended but optically double-ended bent fiber FBG temperature sensor probe incorporating a cylindrical casing and a desired seal;

FIGS. 6A-6C show a further exemplary illustrative non-limiting implementation of a physically single-ended but optically double-ended bent fiber FBG temperature sensor probe incorporating a casing with an oval cross-section;

FIGS. 7A-7D show an exemplary illustrative non-limiting implementation of a miniature FBG loop temperature sensor incorporating a 360° uniform bend;

FIG. 8 shows a further exemplary illustrative non-limiting example of a 360° loop sensor incorporating fibers further bent an additional 90°;

FIGS. 9A and 9B show a further exemplary illustrative non-limiting implementation of a 360° loop temperature sensor in a racetrack configuration;

FIG. 11 shows an exemplary illustrative non-limiting implementation of a method of making a mechanical bend and applying mechanical constraints.

FIGS. 14A-14B show a further exemplary illustrative example of two hermetic seals formed between outer thermoplastic tubes forming a sensor casing and an optical fiber entering and exiting the casing through two inner, single lumen tubes, in an in-line configuration.

Figure 3A:
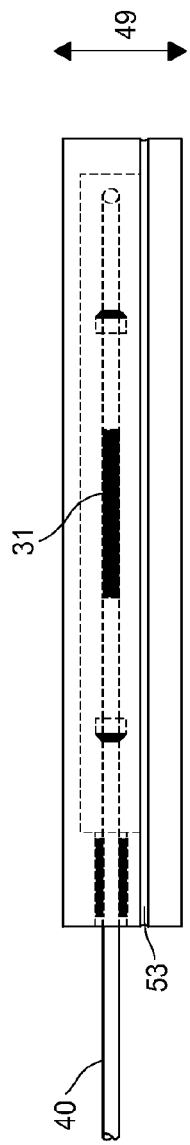
FIGS. 3A-3D show illustrative examples of one type of compact casing in which the fiber/FBG assembly of FIG. 2A may be encased and protected.
Figure 3B:
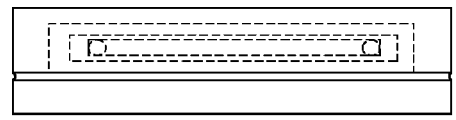
Figure 3C:
Figure 3D:
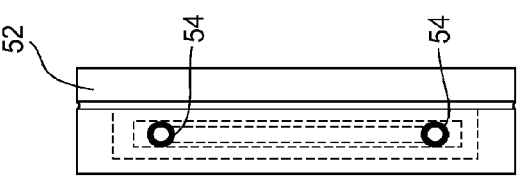

Note: The drawings herein represent the fiber in two dimensions while intending that bonds or seals are made completely around the circumference of the fiber, and further that a buffer coating is included on the fiber except when noted.

DETAILED DESCRIPTION

FIGS. 2A-2E show different views of one example illustrative non-limiting example implementation providing a competitively small, physically single ended and yet optically double ended, strain-free temperature sensor probe. In FIG. 2A, the input/output fibers 30, 30' shown have numerical aperture greater than 0.15 and a 180° uniform mechanical or thermal bend with uniform radius 35 less than or equal to 10 mm. At least one front brace 32 is provided with its centerline substantially along the diameter of the bend 35 and at least one back brace 33 fixed to the fiber at least at points 34 with a fixative. The purpose of said braces 32, 33 is to maintain the at least one FBG 31 free of longitudinal and/or bending stresses, while being of low enough mass to prevent the fiber from bending substantially in the direction normal to the plane of the 180° bend under gravity or other forces. While said braces 32 and 33 may be of different materials, it is preferable that they be of the same material in order that the expansion and contraction of the braces under thermal cycling will be transferred to the regions outside the braced length containing the FBG, i.e., to the bend 35 and to the length of fiber between brace 33 and the casing fiber feedthroughs (see FIGS. 3A-3D), thus further isolating the FBG from effects of the fiber mounting, encasement and the manner of mounting of the casing to the object to be measured. This feature enables the example, illustrative non-limiting FBG to have the buffer layer removed without causing vulnerability to static fatigue fracture or vibration, further enhancing its temperature repeatability by the removal of all dissimilar materials from contact with the FBG. In this manner, the braces may be of a high silica glass that closely matches the fiber thermal expansion coefficient (TCE), a metal or a polymer that are highly mismatched to the TCE of the fiber. Also indicated are directions 37-39 for which the temperature-induced motion of the FBG is independent of the TCE of its casing and the influence of any object to which the casing is attached, excepting the temperature of said object. 34 may be for example but non-exclusively an epoxy or other glue (loaded with an inorganic material or completely organic), a melted polymer or fluoropolymer, a ceramic material, or a silica-based sealing glass material If the fiber buffer coating is removed in most of the area between the braces 32, 33, the only material or component affecting the temperature sensitivity and temperature reproducibility of the FBG is the glass fiber itself. Thus in the direction 38, the FBG is not affected even by differential expansion coefficients of a buffer coating and irreproducibilities due to shear forces between the buffer coating and the glass, which can cause slippage or yield and thus cause significant changes in temperature calibration with time. On the other hand, in the directions typified by 37, the braces 32, 33 expand and contract identically, keeping the two legs of the fiber between them parallel and transferring stress to the non-sensing portions of the structure, namely the bend of radius 35 and the fiber lengths between brace 33 and the fiber feedthrough points in the casings 54, such as shown in FIGS. 3A-3D. Thus braces 32, 33 can be made of a material with a much different expansion coefficient than that of the optical fiber, such as for example polyimide.

FIG. 2B is an orthogonal view of the assembly shown in FIG. 2A with the addition of the indicated direction 39 in which the fiber is free to move without contact with the casing.

FIG. 2C is one illustrative configuration of braces 32 and 33, which contain the fiber by means of machined holes and a fixative.

FIG. 2D shows several illustrative configurations of braces 32 and 33, in which the fiber may be contain by means of notches or multi-piece configurations. The fixatives are not shown for clarity.

FIG. 2E is the same as FIG. 2A with the addition of further protection of the FBG in the form of a small, lightweight tube 36, as non-exclusive examples a metal hypodermic needle tube or a glass capillary tube, which may or may not be round in cross section, which may or may not be of one piece and may or may not be radially symmetrical. Said protection tube may be free to move independently of the fiber expansion and contraction in the direction 38 or may be attached only at one end to the fiber or a brace without influencing the stability or temperature calibration of the FBG. Said protection tube can be suspended free of contact with the area of the fiber containing the FBG, wherein said FBG may or may not have its buffer coating removed, by ensuring that its ends ride on the buffer coating outside the length containing the FBG. Also shown is an end view of the assembly indicating the small radius, light weight nature of the protection tube 36.

FIGS. 3A-3D show illustrative examples of one type of compact casing in which the fiber/FBG assembly of FIG. 2A may be encased and protected. The dimensions of said casing may be, as a non-exclusive example, 1 cm×2 cm×0.4 cm or smaller. The casing 50 may be nonexclusively metal with a cavity 51 to contain and protect the FBG in the bent fiber assembly while allowing said bent fiber assembly to move in any of directions 47, 48 and 49 under thermal stimulus from the environment to be measured without said casing or environment influencing the temperature calibration of the sensor or the reproducibility of the sensor calibration. Said casing 50 may have a metal lid 52 that can be soldered, brazed or welded with lid seal 53, may be ceramic with a glass-frit-sealed lid or polymer with an adhesive sealed or welded lid. Any number of other casing shapes, types and configurations may be equally possible for different applications. Hermetic seals 54 between the fiber 40 and the casing 50 combine to contain an atmosphere that may non-exclusively contain a partial vacuum, air, an inert atmosphere or a high thermal conductivity gas such as helium. Preferably, said atmosphere will contain at least a partial pressure of helium gas to enhance heat transfer between the suspended fiber assembly and the casing. Said atmosphere will preferably have a boiling point below the lowest intended temperature of operation of the temperature sensor, and could variously contain helium, hydrogen, neon, nitrogen, oxygen, argon, or a hydrocarbon, but should preferably exclude water vapor to slow any fiber static fatigue damage. Said partial pressure of helium gas will be a preferred, high thermal conductivity addition to any atmosphere to provide the widest operating temperature range with the fastest thermal speed.

FIGS. 4A-4D show an illustrative example of a bent fiber, FBG temperature sensor utilizing a thermally bent 65, annealed fiber that may or may not require or use the front brace 32, 42 of the mechanically bent fiber assembly shown in FIGS. 2A and 3A respectively, but may utilize at least one brace 62, 63 elsewhere. In this case, the preferred material for the brace or braces will be as low an expansion coefficient material as practical, approaching that of fused quartz, $SiO_2$.

FIGS. 5A-5C show a non-exclusive, illustrative example of a physically single ended but optically double-ended bent fiber FBG temperature sensor probe incorporating a cylindrical casing 90 with a cavity 91 having an inside radius 95 of less than about 8.5 mm and further incorporating a rolled and welded distal seal 86 and a plug 92 that contains fiber feedthroughs 94 and seal 93, all of which may be hermetic. The directions of free motion of the FBG assembly for which said FBG is free of the influence of the casing and outside environment except for temperature are shown as 87, 88, and 89.

FIGS. 6A-6C show a further non-exclusive, illustrative example of a physically single-ended but optically double-ended bent fiber FBG temperature sensor probe incorporating a casing 110/111 with an oval cross section, which may alternatively be square or rectangular. Said probe casing additionally incorporates a sealed-on distal end 118 which may have a bolt hole 119 for attaching said casing to the object to be measured, or alternately may provide a convenient tab for welding the casing to the object to be measured and is sealed with seal 113. Said casing also additionally illustrates robust terminations 115 attaching cable jackets 116 to the casing by means of crimp connections 117. Said cabling may also contain strength members such as Kevlar fibers and a smaller diameter liner tube though which the optical fibers run.

FIG. 7A-7D show an illustrative example of a miniature FBG loop temperature sensor 121 incorporated into a 360° uniform bend in an optical fiber 120 with radius 125 in a casing cavity 131 through seals 134. Said casing may illustratively have dimensions of 1 cm×1 cm×0.4 cm or smaller and thus will greatly increase the adaptability of FBG sensors for strain free spot temperature measurement. The thermal response of the FBG in this configuration is substantially independent of the influence of the casing 130 and the manner of fixing to the object to be measured. Further, because a single fixing point or brace 123 with only a small amount of fixative 124 is used over only a very small portion of the bend, the fiber loop is free to expand and contract without disruptive influence of the supporting structure. Outside strain influences do not reach the FBG because its diameter is fixed and suspended in the cavity. A slight bend relief 135 between the loop 125a and the casing 130 inside the cavity 131 prevents the expansion and contraction of the casing plus the object to which the casing is attached for temperature measurement purposes from breaking or straining the fiber inside the cavity but outside the loop. This arrangement makes possible a very compact, physically double-ended (in-line) but still optically double-ended configuration. The desired three degrees of strain-free motion 127, 128, 129 for the grating are maintained.

FIG. 8 shows a further illustrative example view of a 360° loop sensor 145 incorporating FBG 141 with the fibers 140 further bent an additional 90° each in order to provide a physically single ended but still optically double ended temperature sensor. Said additional 90° bends can be mechanically or thermally formed. Isolation from mechanically induced strain in the direction 148 is provided by the fiber sections 142 between the casing feedthrough points 146 and the fixing brace 143 with fixative 144. Optionally, one or more braces could be added in the fiber sections 142. The freedom-of-motion directions 147,148 are indicated, but the third orthogonal direction is also free of all influences except temperature.

FIGS. 9A and 9B show a further illustrative example of a 360° loop temperature sensor in a race track configuration with the at least one FBG sensor 151 incorporated in a straight section of fiber 150 between two braces 152 and 153 in order to provide a physically double-ended and optically-double ended temperature sensor. Said two 180° bends can be mechanically or thermally formed. The straight sections of fiber captured between braces 152, 153 allow the use of FBGs with the buffer coating removed without danger of static fatigue or stress failures. Isolation from mechanically induced strain is further enhanced by slight bends of radius 155 in the fiber sections 156 between the fixing points 154 and the casing feed through points 159. The critical freedom of motion direction 158 is indicated along with the secondary direction 157. The orthogonal direction of freedom is implied as illustrated in FIG. 7C, feature 129.

Figure 10:
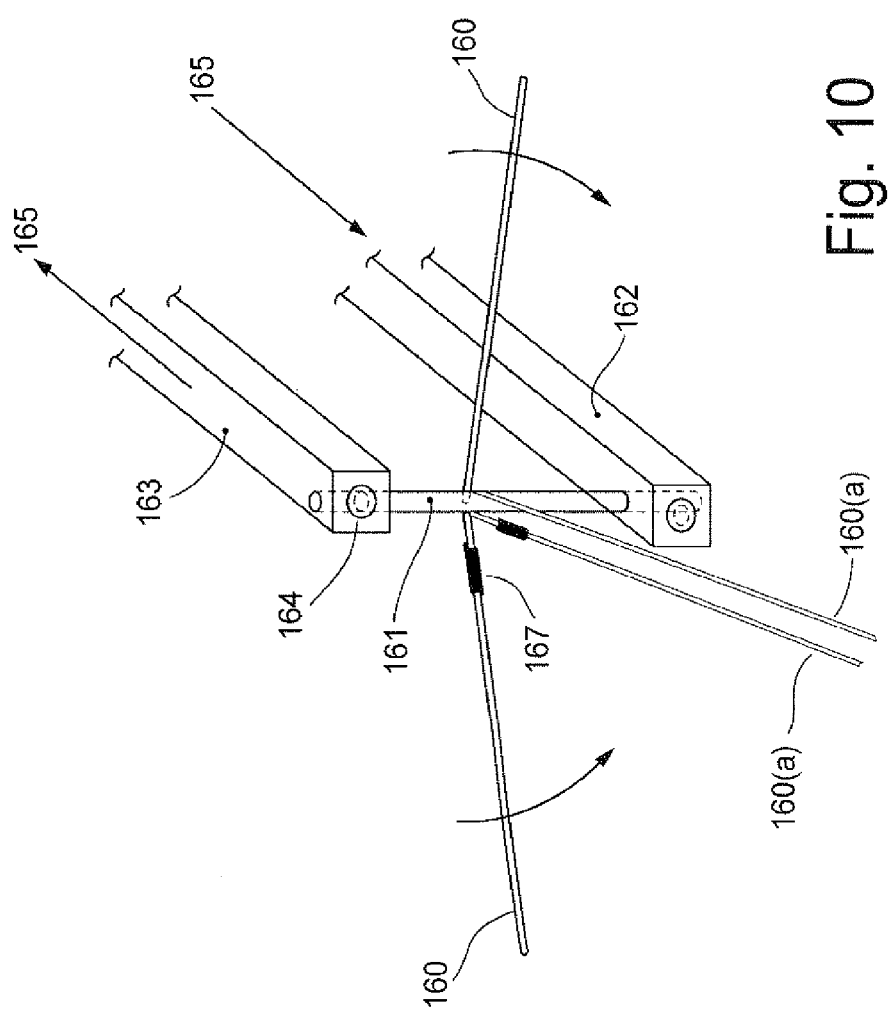
FIG. 10 shows an exemplary illustrative non-limiting implementation of a method of making a permanent, thermally formed bend.

FIG. 10 shows a non-exclusive, illustrative example of a method of making a permanent, thermally formed bend. A self-heated mandrel 161, which may be non-exclusively a graphite, Kanthal™ or Nichrome™ bar or wire, is clamped into buss bars 162, 163 with setscrews 164 or some other means and is heated by current 165. A thermocouple could be welded to the mandrel or an infrared thermometer could be used to monitor the mandrel temperature. Fiber 160 with FBG 167 fabricated in the fiber and is positioned properly for the desired location of the bend. When the mandrel is hot enough, in the neighborhood of 700-1000° C., the fiber is moved to positions 160(*a*) and the mandrel is cooled. The fiber is then removed from the mandrel and the burned-off buffer coating is replaced with the same or another material. Alternately, if the heating is performed in an inert atmosphere, an adherent carbon coating of pyrolyzed buffer coating may be left on the fiber, forming a protective coating. Any braces desired are then added or the fiber is inserted into the casing feedthroughs and affixed to the casing. A 360° C. bend containing a high temperature-tolerant grating can be accomplished in the same manner, or the grating can be written in the fiber after bending.

FIG. 11 shows a non-exclusive, illustrative example of a method of making a mechanical bend. Two posts 174 and 176 are rigidly supported in relation to each other in a fixture and are used to form the fiber 170 containing the FBG 171 and position the braces 172, 173 for the application of the fixative 177 at each point where the fiber is to be attached to the braces. The radius of post 174 is that of the desired fiber bend 175. The distance 178 can be reduced by one half the thickness of the brace 172 to center the fiber bend support at the diameter of the bend, or alternately the post 174 need not be half-round in order to make desired manipulations of the fiber configuration. The braces 172 and 173 can further be clipped to the posts 174, 176 and other positioning and supporting elements 177 can be added as necessary to prevent the fiber and braces from moving and to make the fabrication process efficient and accurate. It is highly desirable in one example non-limiting implementation to prevent the assembly from twisting so the fiber no longer lies in a single plane. The fixture can for example be inserted into an oven to cure the fixative. The sensor is then removed from the fixture and inserted into its casing.

Figure 12A:
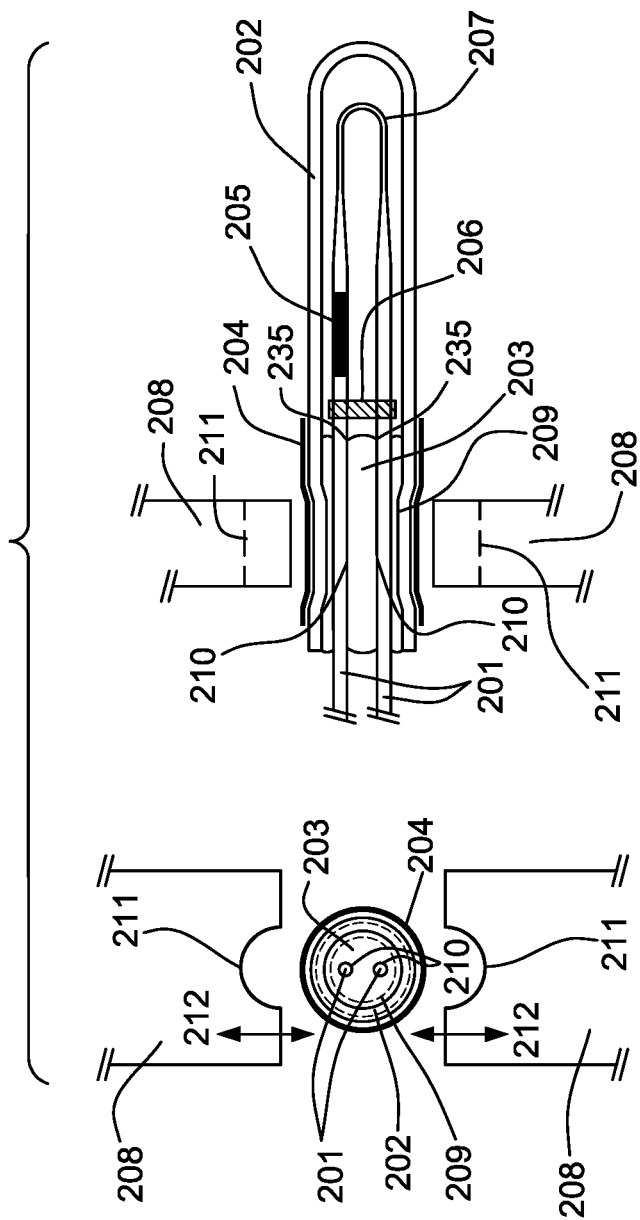
FIGS. 12A-12B show an exemplary illustrative example of hermetic seals formed between outer thermoplastic tubes forming the sensor casing and two sections of optical fiber entering the sensor casing through a single length of double-lumen tube.
Figure 12B:
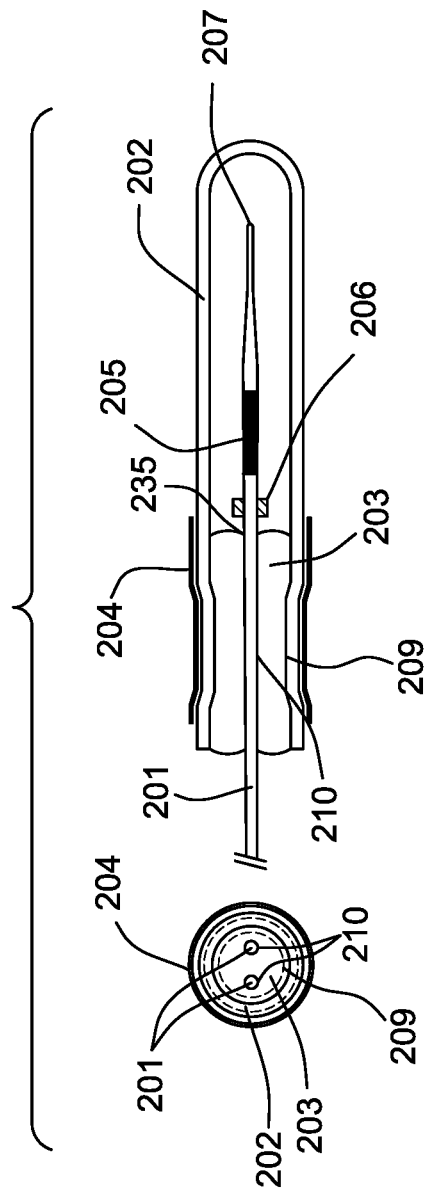

FIGS. 12A and 12B are orthogonal, cross-sectional views of a non-limiting illustration of seals 209 and 210 made simultaneously between two thermoplastic tubes 202 and 203, and between the inner double lumen thermoplastic tube 2033 and a silica optical fiber 201, the outermost buffer layer of which is a thermoset coating (not shown for clarity). Tubes 202 and 203 also comprise the sensor casing. A mold release layer 204, as described elsewhere, is illustrated and serves to ensure that the thermoplastic 202 does not adhere to the heated mold jaws 208 as they clamp and release in direction 212. The heated mold jaws 208 are provided with approximately half-circle depressions 211 with radii less than that of the outer thermoplastic tube 202. The subsequent reduction in the radii of 202 and 203 when they reach their liquefaction temperatures collapses the gaps between the lumens of 203 and the optical fiber 201 and between inside diameter of tube 202 and the outside diameter of tube 203, at the same time accomplishing welds at 209 and bond 210 between tubes 203 and the outer thermoset coating of fiber 201. In this non-limiting illustration, the sealing process is shown for a suspended optical fiber temperature sensor comprising a fiber Bragg grating 205 protected by brace 206 and further enabled by the tapered or drawn-down loop 207 to be of miniature size. The suspended loop protects the fiber Bragg grating from mechanical strains placed on the casing as well as the expansion and contraction of the casing 202, while the extremely flexible nature of the drawn-down fiber further protects the FBG from strain. The two points of penetration of the fiber through the casing, from which the sensor portion is suspended, are indicated by 235.

Figure 13A:
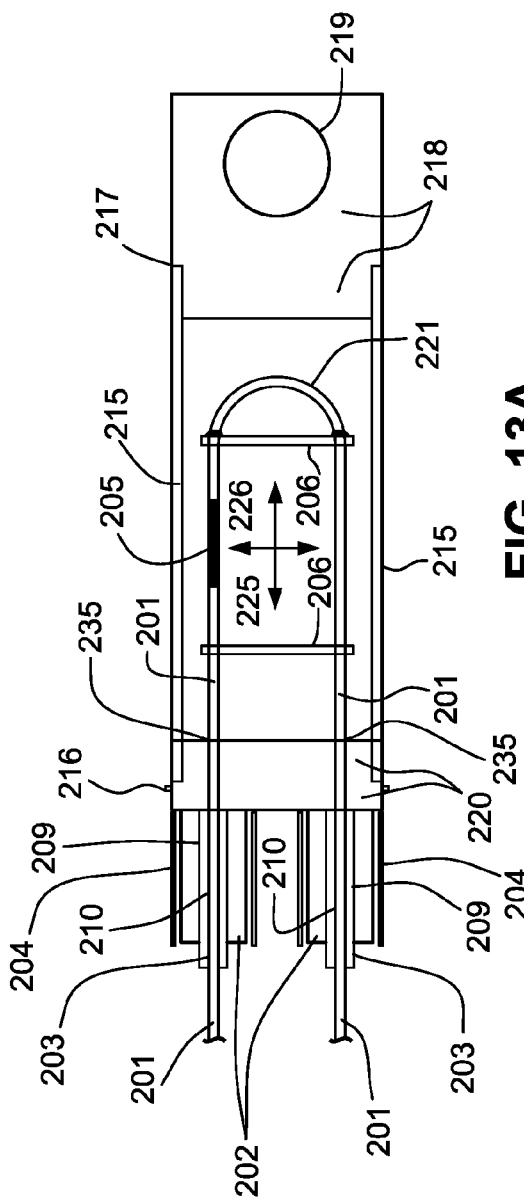
FIGS. 13A-13C show a further exemplary illustrative example of two hermetic seals formed between two outer thermoplastic tubes integral with a sensor casing and two sections of an optical fiber entering the sensor casing through separate inner single lumen tube sections.
Figure 13B:
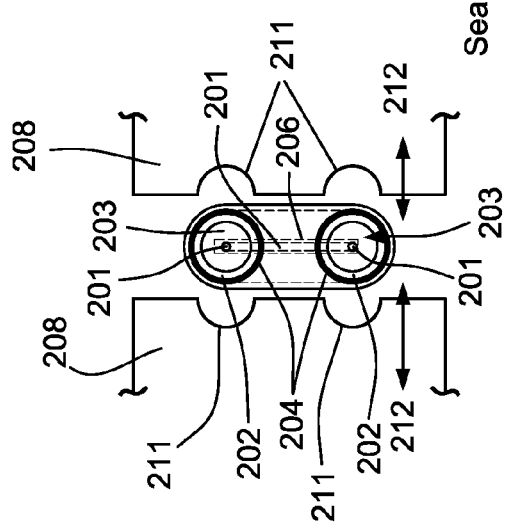
Figure 13C:
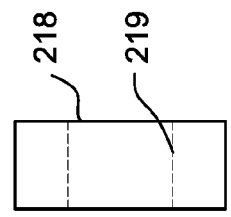

FIGS. 13A, 13B and 13C are orthogonal-views of a non-limiting illustration of seals 209 and 210 made simultaneously on a pair of assemblies between two thermoplastic tubes 202 and 203, and between the inner single lumen thermoplastic tubes 203 and a silica optical fiber 201, the outer buffer layer of which is a thermoset coating (not shown for clarity). A mold release layer 204, as described elsewhere, is illustrated and serves to ensure that the thermoplastic 202 does not adhere to the heated mold jaws 208 as they clamp and release in direction 212. The heated mold jaws 208 are provided with approximately half-circle depressions 211 with radii less than that of the outer thermoplastic tube 202. The subsequent reduction in the radii of 202 and 203 when they reach their liquefaction temperatures collapses the gaps between the lumens of 203 and the optical fiber 201 and between inside diameter of tube 202 and the outside diameter of tube 203, at the same time accomplishing a weld at 209 between tubes 202 and 203 and a bond between tube 203 and the outer thermoset coating of fiber 201. In this non-limiting illustration, the sealing process is shown for a suspended optical fiber temperature sensor comprising a fiber Bragg grating 205 protected by braces 206 and further enabled by a thermally bent loop 207 to be of compact size. In contrast to the sensor illustrated in FIG. 12, this sensor employs an injection-molded outer casing 215, a mounting tab end 218 with a bolt hole 219 and a header 220. The tubes 202 are integrally molded with and are part of the header 220. The fiber loop 221 is enabled to be compact by a high numerical aperture and thermal bending. The header 220 can be laser welded to the casing 215 at 216, as can the mounting tab end 218 at weld 217. The two points of penetration of the fiber through the casing, from which the sensor portion is suspended, are indicated by 235, enabling the sensor in the fiber to be free of the influence of the casing in the plane defined by directions 225 and 226 and also the direction normal to the plane defined by 225 and 226 (not labeled).

FIGS. 14A and 14B are orthogonal, cross sectional views of a non-limiting illustration of seals 209 and 210 made simultaneously between two thermoplastic tubes 202 and 203, and between the inner single offset lumen thermoplastic tube 203 and a silica optical fiber 201, the outer buffer layer of which is a thermoset coating (not shown for clarity). A mold release layer 204, as described elsewhere, is illustrated and serves to ensure that the thermoplastic 202 does not adhere to the heated mold jaws 208 as they clamp and release in direction 212. The heated mold jaws 208 are provided with approximately half-circle depressions 211 with radii less than that of the outermost thermoplastic tube 202. The subsequent reduction in the radii of 202 and 203 when they reach their liquefaction temperatures collapses the gaps between the lumen of 203 and the optical fiber 201 and between inside diameter of tube 202 and the outside diameter of tube 203, at the same time accomplishing a weld at 209 between tubes 202 and 203 and a bond at 210 between thermoplastic tube 203 and the outer thermoset coating of fiber 201. In this non-limiting illustration, the sealing process is shown for a suspended, in-line optical fiber temperature sensor. In contrast to the sensor of FIG. 12, the FIG. 14 sensor comprises a fiber Bragg grating 205 protected from strain due to the expansion and contraction of the casing tube 202 by the tapered or drawn-down S-bend 214 that, because of its small diameter of a few micrometers, is very flexible and effectively leaves the FBG portion of the fiber suspended. The S-bend also protects the fiber Bragg grating from mechanical strains placed on the casing. Also illustrated is the assembly of the thermoplastic, thermoset and optical fiber parts before sealing. This condition is illustrated with part numbers corresponding to those in the already-sealed assembly at the left, but with the addition of an "a" to the number. The two points of penetration of the fiber through the casing, from which the sensor portion is suspended, are indicated by 235 and 235a.

Figure 15A:
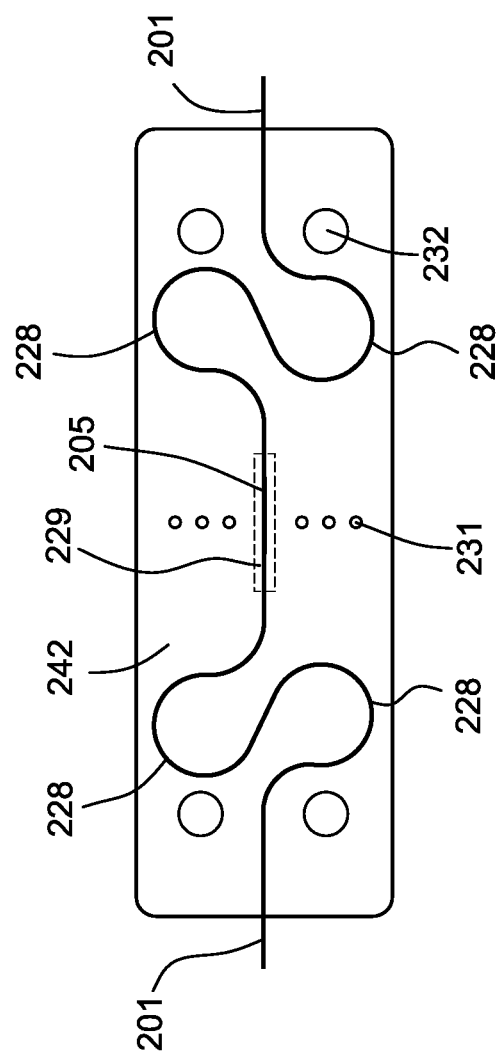
FIGS. 15A-15B show an exemplary illustrative example of a planar fiber optic strain sensor utilizing a serpentine anchor method with an integral fiber Bragg grating sensor element bonded between two plates of a thermoset polymer with one plate of a thermoplastic material.
Figure 15B:
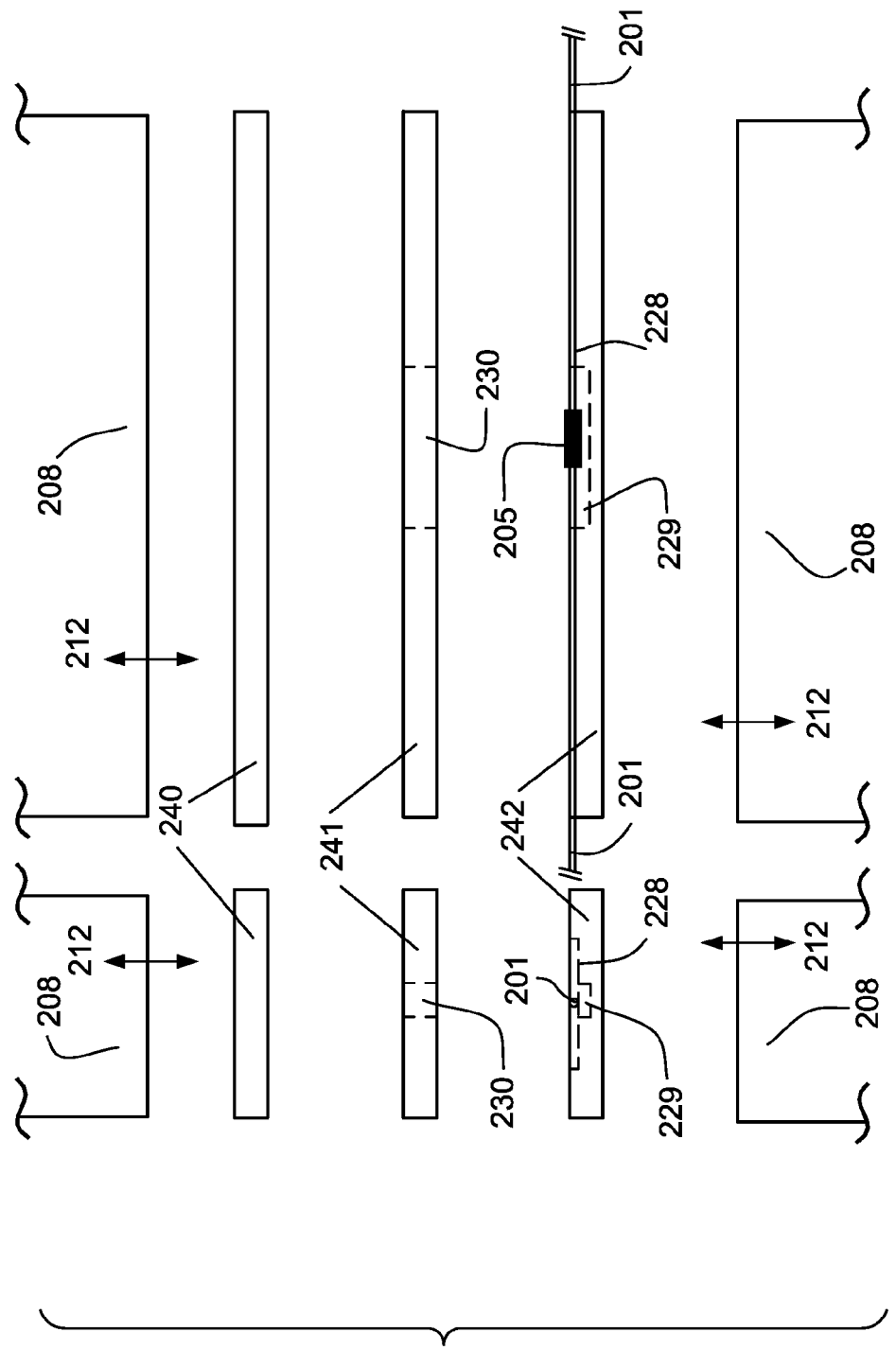

FIGS. 15A and 15B are orthogonal views of a non-limiting illustration of the assembly of a fiber Bragg grating and casing materials comprised of flat, planar parts 240, 241, 242, except for the serpentine groove, the bottom of which is indicated 228, in layer 242 containing the fiber and through holes for various functions. In this case, the cavity 229 (widened and deepened groove) is designed to prevent the FBG-containing section of fiber from rubbing on the casing. Bonds are made simultaneously between two thermoset plates 240 and 242 and a silica optical fiber 201 by melting the at least one intervening thermoplastic plate 241 between them using the heated mold jaws 208. The outer buffer layer of the optical fiber is a thermoset coating (not shown for clarity). Alternatively, the optical fiber coating could employ an extruded thermoplastic coating over the outer thermoset coating of the optical fiber. Thermoset plates 240 and 242 also comprise the outer parts of the sensor casing. The functions of mold release layers, as described elsewhere, are also provided by thermoset plates 240 and 242, and serve to ensure that the thermoplastic 241 does not adhere to the heated mold jaws 208 as they clamp and release in directions 212. Through hole 230 in the thermoplastic layer 241 prevents the thermoplastic from adhering to the FBG or other interferometric sensor section.

Figures 16A, 16B:
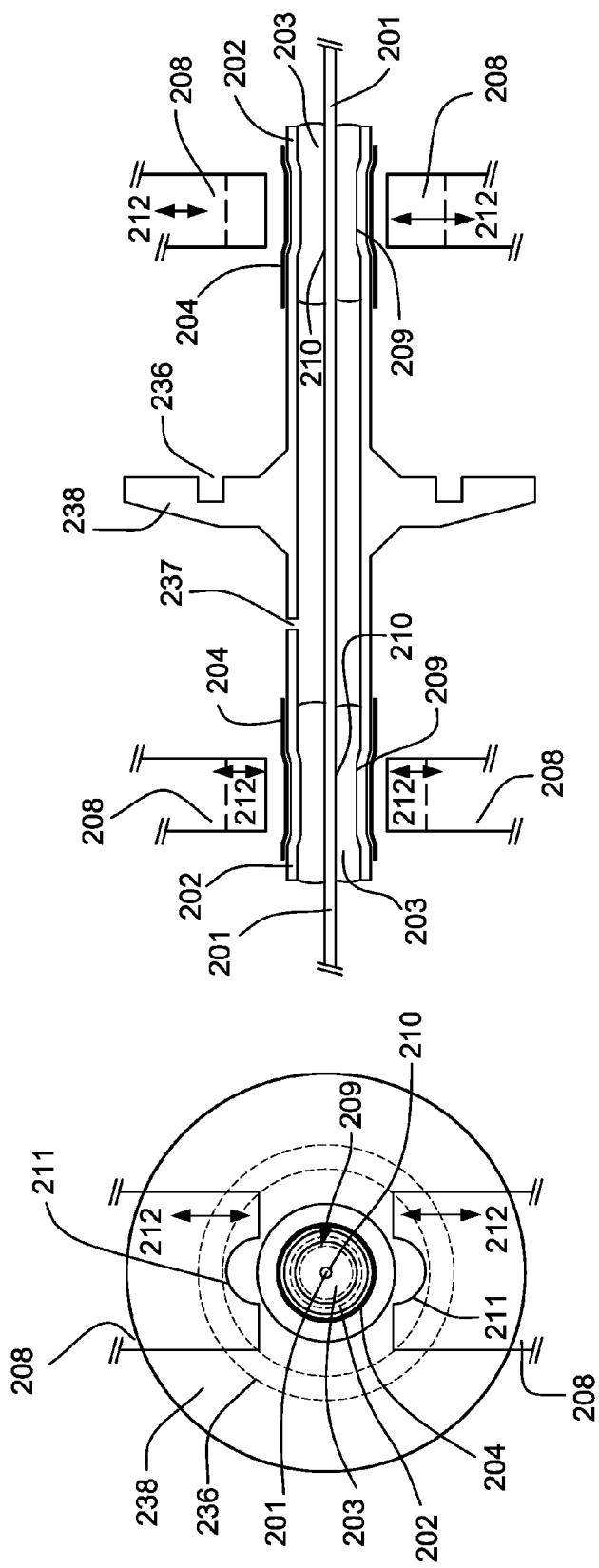
FIGS. 16A-16B shows a further exemplary illustrative example of a hermetic seal formed between two thermoplastic tubes and an optical fiber in a vacuum or pressure feedthrough. The seal away from the O-ring side is not required to be hermetic.

FIGS. 16A and 16B are orthogonal views (16B in cross section) of a non-limiting illustration of seals 209 and 210 made simultaneously between two thermoplastic tubes 202 and 203, and between the inner double lumen thermoplastic tube 203 and a silica optical fiber 201, the outer buffer layer of which is a thermoset coating (not shown for clarity). Tube 202 also comprises an integral, injection molded part of the vacuum or pressure feedthrough flange 238. A mold release layer 204, as described elsewhere, is illustrated and serves to ensure that the thermoplastic 202 does not adhere to the heated mold jaws 208 as they clamp and release in direction 212. The heated mold jaws 208 are provided with approximately half-circle depressions 211 with radii less than that of the outer thermoplastic tube 202. The subsequent reduction in the radii of 202 and 203 when they reach their liquefaction temperatures collapses the gaps between the lumens of 203 and the optical fiber 201 and between inside diameter of tube 202 and the outside diameter of tube 203, at the same time accomplishing a weld at 209 between tubes 202 and 203 and a bond at 210 between tube 203 the outer thermoset coating of fiber 201. The O-ring side of the feedthrough flange is 236, and the flange may be O-ring sealed to another ISO KF flange with a commonly available clamp. 237 is a vent to prevent virtual leaks and facilitate leak detection. The fiber seal on the end opposite the O-ring seal side 236 is not required to be hermetic.

The all-thermoplastic flange and sealing method provides a much more economical vacuum/pressure feedthrough than is commonly available commercially. Many manufacturers require many weeks and $1000 up to $4000 for a solder sealed, stainless steel feedthrough. Some also depend on epoxy adhesive seals that are almost as expensive and long to deliver, and are not reliable under extreme temperature cycling.

Definitions

Index contrast: The difference between the higher index of refraction of the fiber core and the lower index of refraction of the fiber cladding.

Bend-sensitive fiber (high loss with reference to bending): Numerical aperture lower than or equal to 0.15, usually designed to be low loss in both the 1300 nm and 1550 nm wavelength bands—common communications fiber (e.g., Corning SMF-28 or 28e™)

Bend-insensitive fiber (low loss with reference to bending): Numerical aperture of greater than 0.15.

Holey fiber (sometimes called a photonic crystal or photonic bandgap fiber): High numerical aperture fiber in which the high index contrast is provided by an array (usually a geometrically regular array) of holes in the cladding around the core of the fiber, and running parallel to the core throughout the length of the fiber. May have a hollow core. Such holes may contain a gas, a liquid added after fiber drawing, or a vacuum.

Nanostructured fiber: Fiber with a ring of nanostructures around the core that produces the effect of a high numerical aperture fiber but allows a larger mode field diameter than bend insensitive fiber and good transmission in a wider band of wavelengths (e.g., Corning Photonics ClearCurve® optical fiber made with nanoStructures™ technology, approximately 1285-1625 nm). Much smaller radius bends are possible than with the same company's SMF-28e™ fiber, but it is still fully compatible with SMF-28e™.

Uniform bend: A bend in the fiber made by mechanical or thermal means without changing the diameter of the fiber materially.

Mechanical bend: A bend made with mechanical force and maintained with a mechanical constraint that is mechanically stiff but light weight and small enough to move with the fiber without causing dragging on the case or distortion to the FBG signal.

Thermal bend: a bend in the fiber made by heating it thermally above its softening point to permanently form the bend in a stress-free condition without materially affecting the fiber diameter, after which the bend can be recoated with a buffer coating to protect it.

Tapered or drawn bend: A bend in the fiber made by thermally heating the fiber above its softening point, stretching it so its diameter tapers smoothly (adiabatically) to a minimum and smoothly returns to the original diameter, afterward forming at least one bend either mechanically or by further thermal treatment. Minimal fiber diameter of a few microns can reduce optical intensity losses to a few percent or less by causing the light to be guided in the remaining glass with air as the 'cladding' (air-guided fiber).

180° bend: Includes bends in the fiber that are of constant radius, a mix of different radii and straight sections, a piecewise linear, segmented circle, an angle or a circle segment that is more than 180° or somewhat less than 180°.

UV flood: Subjecting the length of a fiber bend to a fluence of deep ultraviolet radiation of sufficient intensity such that the index of refraction of the fiber core is increased above the original index of refraction of the fiber core and over the entire length of the bend, thus increasing the numerical aperture and reducing the loss of light intensity of the signal light in the fiber core.

Un-stripped grating: An FBG that is written during the fiber drawing process before the buffer coating is applied or is written through a buffer coating without stripping and recoating the buffer.

Optically double ended sensor: Sensor with two optical fibers emerging from the casing, in any direction, with either fiber being useable as the input or the output fiber and able to operate either in reflection or transmission.

Optically single ended sensor: Sensor with only one fiber entering the casing and able to operate only in reflection.

Physically double ended sensor: Sensor with the input and output fibers emerging from the casing at substantially opposite ends and substantially parallel.

Physically single ended sensor: Sensor in a probe configuration with both fibers emerging from the sensing portion of the casing substantially in the same direction Fixitive: A material or method of producing a hard, rigid attachment of an optical fiber to another structure or material.

Thermoplastic polymers (or thermosoftening plastics): are broadly defined as polymers that become pliable without a phase change and will flow relatively easily under applied force above their glass transition temperatures and below the temperature where they become fully liquid (liquefaction). Upon cooling, they will become solid and may be re-heated and formed reversibly into different shapes. It should be understood that this definition is not confined to only one specific formulation or brand name such as Victrex™ 450G, a polyether ether ketone (PEEK). There exist myriad variations of these polymers, including co-polymers, additives and modifications to molecular compositions and structures for various applications.

A thermosetting polymer (also a thermoset) is a pre-polymer material that cures (polymerizes) irreversibly. It does not melt, but decomposes at high enough temperatures. It cannot be re-processed into different shapes by melting or molding once cured. It should be understood that this definition is not confined to only one specific formulation or brand name such as DuPont Kapton™, a polyimide (PI). There exist myriad variations of these polymers, including co-polymers, additives and modifications to molecular compositions and structures for various applications.

Liquefaction temperature is defined here as the temperature, or temperature range, in which the material undergoes a phase change from a solid to a liquid. This may or may not be a transition at a single temperature.

A body, part or object, as defined here, is a piece of material of some useful shape that may be used in the method of this application to make a useful composite device or object composed of thermoset, thermoplastic and possibly other materials, such as silica glass or metal. Such objects may be rectangular, cylindrical, spherical or substantially planar, among many other regular and composite shapes.

A force-applying means is defined here by non-limiting examples of mechanical or pneumatic actuators. Mechanical force is defined here to mean an applied force designed to press one or more thermoplastic and thermoset surfaces intimately together while the one or more thermoplastic bodies are being melted. The force may be comprised of a motorized mechanism, a pneumatic mechanism, a magnetically actuated mechanism, weights, heat shrinkable tubing or any other suitable mechanism such as a designed interference fit between any two bodies in the assembly. "Interference fit" means placing two bodies into forced contact so that the surface of one is in compression and the mating surface of the other is in tension. Such a fit that may remain in place and remain in tension and/or compression when any applied force is removed is frequently known as a "snap fit".

Bonding is defined here as the process of forming a bond between at least two bodies that is strong enough to withstand the stresses of an intended application without coming apart or de-bonding. Such a bond may be termed to form a "seal" if the bond is specifically intended to keep foreign materials out of a volume or desired materials inside, such as a sensor casing or a pressure vessel, as non-exclusive examples. It may be deemed a "weld" if the at least two bodies are of a similar class of materials, such as thermoplastics and melting of all bodies occurs as the welding mechanism. As a non-limiting example, a third body can be used as a filler material between two others.

A carbon-forming temperature is reached when the surface of a thermoset begins to decompose and forms a layer that is substantially carbon. This temperature may depend on the atmosphere, with inert and oxygen-containing atmospheres producing different results.

A mold release material is a material that may be applied to a mold to prevent adhesion of a molten material to the mold surface, or in the case of this application, naturally does not adhere to the mold because it does not melt. The mold release material may be applied to the mold or the outer surface of a thermoplastic component in an assembly in liquid form, such as a polyimide precursor, and then cured. The mold release material may or may not remain permanently on the surface of the mold or on the outer surface of the thermoplastic components. "Outer surface of a thermoplastic" means the surface of the thermoplastic nearest the mold during the melting process unless otherwise noted.

A buffer layer on a silica glass optical fiber is a coating or coatings of a material or materials that is applied to the fiber during the drawing process. Non-exclusive examples are an acrylate compound, a polyimide compound, carbon, a metal or an organometallic material such as Omercer™. There may two or more coatings put on the fiber in succession during the drawing process. A non-exclusive example may be a polyimide compound over a carbon coating.

An extruded layer on a silica glass optical fiber is put on after the buffer layer is applied and the fiber is coiled for storage or further processing. The fiber is drawn back though a die and, as a non-exclusive example, a thermoplastic polymer is melted onto the fiber, forming a continuous layer or coating that solidifies not far from the end of the heated die. The application of a mechanical force is not required. In general, additives to the thermoplastic may be required to prevent so much stress on the fiber that excess birefringence and power losses are induced.

An interferometric optical device is non-exclusively a Fabry-Perot etalon (FP), a fiber Bragg grating (FBG), a Michelson interferometer, or other such device that may or may not be used to sense physical parameters such as temperature, pressure and strain. Such devices may or may not be built into an optical fiber device, or connected optically by an optical fiber only for excitation and data transmission.

A suspended optical fiber temperature sensor is a sensing element, such as a fiber Bragg grating, contained within or composed partially by optical fiber and, further, that is isolated from strain by being suspended free of contact with its sensor casing except at one or two points of contact where the optical fiber penetrates the casing. The sensor element and fiber structure containing it are light enough to be entirely supported in space by the optical fiber from the points of penetration of the fiber through the casing, and the sensor structure is so configured that the expansion and contraction of the casing caused by temperature changes or applied mechanical force does not stretch, compress or bend the sensor. Such a configuration may be 180° loop or a tapered, drawn-down S-bend, as described elsewhere.

A sensor casing is non-exclusively a volume container completely surrounding a sensor and preferably hermetically sealed to the fiber.

With respect to polymer tubing, a lumen is used here in the biological sense, meaning an opening. A lumen is usually a hole running the length of the tubing, not necessarily concentric with the outside of the tubing, but usually constantly spaced from the outside wall, and usually of a constant inside diameter. Multi-lumen tubing has more than one hole running parallel along the length of the tubing. Multi-lumen tubing may be produced, as a non-exclusive, illustrative example, by extrusion.

As a not-limiting example, an optical waveguide is a structure that transmits a signal in the ultraviolet to infrared spectral wavelength span with low power losses and possibly other designed functions. It basically is constructed with a light-guiding core possessing an index of refraction surrounded by a cladding of another material with a lower index of refraction. Such cladding materials are usually, but not always, similar in formulation to the core. The lower index of refraction material may be air or other gas, or the core can be surrounded by air or vacuum cavities running parallel to the core along the length of the waveguide (typically known as "holey" or "photonic crystal" structures. The structure may contain steps or gradients in index of refraction. As non-limiting examples, the structure may be cylindrical, may be kilometers long, or have flats or twists in it, the core may be circular or oval in cross section or have built-in stress-inducing members running parallel to the core. A waveguide may be planar, such as being formed on a flat substrate such as a glass or silicon wafer. Silica glass is defined as silicon dioxide as a major constituent, at least 50 molecular percent and as much as 100%. Hermetic means a leak rate of about $1xe^{-6}$, but preferably less than $1xe^{-7}$ atmospheres×cm³/second.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A method of obtaining strong adhesion between at least one optical waveguide structure and at least one thermoplastic polymer, the at least one optical waveguide structure being at least partially coated with at least one bonded thermoset polymer, the method comprising:
melting at least one thermoplastic polymer completely surrounding said thermoset coating in at least areas at which a bond is intended with the addition of a mechanical force provided by at least one force-applying member to create a bond or bonds between the at least one thermoplastic polymer and the at least one coating of thermoset polymer on the at least one optical waveguide structure, wherein
the bond formed is strong and adherent enough to form a hermetic seal between the at least one thermoset coating and the at least one thermoplastic polymer, and the temperature of the melting process is equal to or greater than the liquefaction temperature or temperature range of the at least one thermoplastic polymer and lower than the decomposition or carbon-forming temperature of the at least one thermoset polymer, and
employing at least one mold release material between a force-applying member and the thermoplastic polymer while molten.

2. The method according to claim 1, wherein
the mechanical force comprises one or both of an applied mechanical force or a force from an interference fit between at least one thermoplastic and at least one thermoset part.

3. The method according to claim 1, wherein
the at least one thermoplastic polymer comprises a polyether ether ketone polymer.

4. The method according to claim 1, wherein
the at least one thermoplastic polymer comprises a polyether ketone ketone polymer.

5. The method according to claim 1, wherein
the at least one thermoplastic polymer comprises a polyether-imide polymer.

6. The method according to claim 1, wherein
the at least one thermoplastic polymer comprises a polysulfone or polyether sulfone polymer.

7. The method according to claim 1, wherein
the at least one thermoset material comprises a polyimide polymer.

8. The method according to claim 1, wherein
the at least one thermoset material comprises a polyamide polymer.

9. The method according to claim 1, wherein
the at least one thermoset polymer comprises a polyamide-imide polymer.

10. The method according to claim 1, wherein
the at least one thermoset polymer comprises a cured or partially cured epoxy polymer.

11. The method according to claim 1, wherein
the at least one mold release material comprises a thermoset polymer with a decomposition temperature greater than the highest liquefaction temperature of the thermoplastic polymer(s) employed in the bond.

12. The method according to claim 1, wherein
the at least one mold release material comprises a thermoplastic polymer with a liquefaction temperature range greater than those of the other thermoplastic polymer(s) employed in the bond.

13. The method according to claim 1, wherein
the at least one mold release material comprises a silicone compound.

14. The method according to claim 1, wherein
the at least one mold release material comprises a fluorocarbon compound.

15. The method according to claim 1, wherein
the at least one thermoset polymer comprises at least the outermost layer of a buffer coating on a silica glass optical fiber.

16. The method according to claim 1, wherein
the at least one thermoset polymer comprises at least an outer layer of a buffer coating on an optical fiber followed by an extruded coating of a thermoplastic polymer.

17. The method according to claim 16, wherein
the optical fiber coating comprises a thermoplastic coating extruded or melted on top of an outer layer of a thermoset material that is the original outer layer of the fiber buffer coating on a silica glass optical fiber as drawn, prior to a further local melting of at least one additional thermoplastic part.

18. The method according to claim 1, wherein
said optical fiber is a silica glass optical fiber.

19. The method according to claim 1, wherein
the surfaces of either or both the thermoset and thermoplastic polymers to be bonded are treated with abrasive, chemical, plasma or corona means prior to bonding to enhance adhesion.

20. The method according to claim 1, wherein
the hermetic seal is made in at least one location on at least one optical fiber containing at least one interferometric optical device to form a hermetically sealed, suspended temperature sensor.

21. The method according to claim 20, wherein the interferometric optical device is one or more of a fiber Bragg grating, a Fabry-Perot or a Michelson interferometer.

22. The method according to claim 1, wherein the hermetic seal is made in at least one location on at least one optical fiber containing at least one interferometric optical device to form a hermetically sealed strain sensor.

23. The method according to claim 1, wherein the hermetic seal is made on at least one optical fiber in at least one location to form a vacuum or pressure bulkhead feedthrough.

24. The method according to claim 1, wherein the at least one mold release material comprises an inorganic material or a polymer that decomposes during the bonding process to an inorganic material with a melting range higher than the melting range of all said at least one thermoplastic polymer.

25. A method of obtaining a hermetic seal, comprising at least one layer or structure made of at least one thermoplastic material, between thermoplastic polymers and optical waveguides coated with at least one layer of a thermoset polymer, without the use of additional adhesives requiring chemical curing during employment of the method, wherein the optical waveguide comprises at least one structure that provides for the guiding of optical waves along the waveguide with a predetermined low loss of light power for a predetermined distance, the method comprising:
    coating at least one surface of the optical waveguide structure with at least one layer of a thermoset polymer, followed by curing said thermoset polymer and
    melting at least one structure of thermoplastic against said thermoset polymer with or without the addition of mechanical force.

26. The method according to claim 25, wherein the waveguide comprises an optical fiber.

27. The method according to claim 25, wherein the waveguide comprises an optical fiber with a light-guiding core possessing a higher index of refraction than a cladding material of nearly the same composition surrounding the core.

28. The method according to claim 27, wherein the cladding material contains regions of gas or vacuum.

29. The method according to claim 25, wherein the at least one waveguide is a planar waveguide.

* * * * *